US011698644B2

(12) United States Patent
Jornod et al.

(10) Patent No.: US 11,698,644 B2
(45) Date of Patent: *Jul. 11, 2023

(54) METHOD, COMPUTER PROGRAM, APPARATUS, VEHICLE, AND NETWORK COMPONENT FOR CONTROLLING A MANEUVER WITHIN A PLATOON

(71) Applicant: VOLKSWAGEN AKTIENGESELLSCHAFT, Wolfsburg (DE)

(72) Inventors: Guillaume Jornod, Berlin (DE); Andreas Pfadler, Berlin (DE)

(73) Assignee: Volkswagen Aktiengesellschaft

( * ) Notice: Subject to any disclaimer, the term of this patent is extended or adjusted under 35 U.S.C. 154(b) by 178 days.

This patent is subject to a terminal disclaimer.

(21) Appl. No.: 17/172,469

(22) Filed: Feb. 10, 2021

(65) Prior Publication Data
US 2021/0247777 A1    Aug. 12, 2021

(30) Foreign Application Priority Data

Feb. 11, 2020    (EP) .................................... 20156656

(51) Int. Cl.
*G05D 1/02*    (2020.01)
*H04W 4/46*    (2018.01)
*G08G 1/00*    (2006.01)

(52) U.S. Cl.
CPC ............. *G05D 1/0291* (2013.01); *G08G 1/22* (2013.01); *H04W 4/46* (2018.02)

(58) Field of Classification Search
CPC .................................. G08G 1/22; H04W 4/46
See application file for complete search history.

(56) References Cited

U.S. PATENT DOCUMENTS 10,073,464 B2    9/2018  Pilkington
2019/0246303 A1   8/2019  Alieiev et al.

FOREIGN PATENT DOCUMENTS

| DE | 10356256 A1 | 7/2005 |
| DE | 102012212339 A1 | 1/2014 |
| DE | 102016006523 A1 | 12/2016 |
| DE | 102017204326 A1 | 4/2018 |
| DE | 102016226050 A1 | 6/2018 |
| EP | 3731204 A1 | 10/2020 |
| EP | 3790296 A1 | 3/2021 |

(Continued)

OTHER PUBLICATIONS

Written Decision on Registration; Korean Patent Application No. 10-2021-0019868; dated Aug. 22, 2022.

(Continued)

*Primary Examiner* — Alan D Hutchinson
*Assistant Examiner* — Andy Schneider
(74) *Attorney, Agent, or Firm* — Barnes & Thornburg, LLP

(57) ABSTRACT

A method, a computer program, an apparatus, a transportation vehicle, and a network component for controlling a maneuver within a platoon of transportation vehicles. The method for controlling a maneuver within a platoon of transportation vehicles includes receiving information related to a maneuver for the platoon; determining information on a fuel efficiency of the maneuver based on fuel consumptions for maneuvering from an initial state to a maneuver target state, keeping the maneuver target state, and reverting from the maneuver target state to the initial state; and deciding whether to perform the maneuver based on the information on the fuel efficiency.

25 Claims, 17 Drawing Sheets

(56) References Cited

FOREIGN PATENT DOCUMENTS

| | | |
|---|---|---|
| JP | 2011219056 A | 11/2011 |
| JP | 2013164758 A | 8/2013 |
| JP | 2015020501 A | 2/2015 |
| JP | 2018531474 A | 10/2018 |
| KR | 20170047043 A | 5/2017 |
| KR | 20170076645 A | 7/2017 |
| KR | 20170128/187 A | 11/2017 |
| KR | 20190105026 A | 9/2019 |
| SE | 1550721 A1 | 1/2017 |
| WO | 2017035516 A1 | 3/2017 |

OTHER PUBLICATIONS

Search Report for European Patent Application No. 20156656.9; dated May 16, 2022.
Alam et al.; An Experimental Study on the Fuel Reduction Potential of Heavy Duty Vehicle Platooning; 13th Int. IEEE Conference on Intelligent Transportation Systems (ITSC); IEEE; pp. 306-311; 2010.
Alam; Fuel-Efficient Heavy-Duty Vehicle Platooning; Ph.D. dissertation; KTH Royal Institute of Technology; 2014.
Alieiev et al.; Improving the Performance of High-Density Platooning Using Vehicle Sensor-Based Doppler-Compensation Algorithms; IEEE Transactions on Intelligent Transportation Systems; Jan. 2020; vol. 21; No. 1.
Hausberger et al.; Cooperative Self-Organizing System for low Carbon Mobility at low Penetration Rates; COLOMBO: Deliverable 4.2; Extended Simulation Tool PHEM coupled to SUMO with User Guide; Feb. 2014.
Hucho et al.; Aerodynamics of Road Vehicles; Annual Review of Fluid Mechanics; Society of Automotive Engineers; 1993.
Jornod et al.; Environment-Aware Communications for Cooperative Collision Avoidance Applications; 2018 IEEE 19th Int. Symp.; A World of Wireless, Mobile and Multimedia Networks (WoWMoM); pp. 588-599; Jun. 2018.
Jornod et al.; Sidelink Technologies Comparison for Highway High-Density Platoon Emergency Braking; 2018 IEEE 16th Int. Conf. Intell. Transp. Syst. Telecommun. (ITST); Oct. 2018; pp. 1-7.
Jornod et al.; Packet Inter-Reception Time Modeling for High-Density Platooning in Varying Surrounding Traffic Density; 2019 European Conference on Networks and Communications (EUCNC); IEEE; pp. 187-192; Jun. 18, 2019.
Kennedy et al.; Particle Swarm Optimization; 1995 Int. Conf. Neural Networks (ICNN'95); Nov. 1995; vol. 4; pp. 1942-1948.
Liang et al.; When is it Fuel Efficient for a Heavy Duty Vehicle to Catch Up With a Platoon?; 7th IFAC Symposium on Advances in Automotive Control; Jan. 1, 2013; pp. 738-743.
Liang et al.; Heavy-Duty Vehicle Platoon Formation for Fuel Efficiency; IEEE Transactions on Intelligent Transportation Systems; Apr. 1, 2016; vol. 17, No. 4; pp. 1051-1061.
Llatser et al.; Simulation of Cooperative Automated Driving by Bidirectional Coupling of Vehicle and Network Simulators; IEEE Intell. Veh. Symp. (IV); 2017; pp. 1881-1886.
Lopez et al.; Microscopic Traffic Simulation using SUMO; 2018 21st International Conference on Intelligent Transportation Systems (ITSC); Nov. 2018.
Luo et al.; Coordinated Platooning with Multiple Speeds; Transportation Research, Part C, Emerging Technologies; May 1, 2018; vol. 90; pp. 213-225.
Navarro et al.; Distributed Graph-Based Control of Convoys of Heterogeneous Vehicles using Curvilinear Road Coordinates; 19th IEEE Int. Conf,. Intell. Transp. Sys. (ITSC); 2016; pp. 879-886.
Pfadler et al.; Predictive Quality of Service: Adaptation of Platoon Inter-Vehicle Distance to Packet Inter-Reception Time; IEEE 91st Veh. Technol., Conf. (VTC Spring); 2020.
Riley et al.; The ns-3 Network Simulator; 2010; pp. 15-34; Springer Berlin Heidelberg.
Shi et al.; A Modified Particle Swarm Optimizer; 1998 IEEE International Conference on Evolutionary Computation Proceedings; IEEE World Congress on Computational Intelligence; May 1998; pp. 69-73.
Tibshirani; Regression Shrinkage and Selection via the Lasso; Journal of the Royal Statistical Society (Series B); 1996; vol. 58; pp. 267-288.
Tsugawa et al.; A Review of Truck Platooning Projects for Energy Savings; IEEE Trans. on Intell. Veh.; Mar. 2016; vol. 1, No. 1; pp. 68-77.
Van De Hoef et al.; Fuel-Efficient En Route Formation of Truck Platoons; IEEE Trans. on Intell. Transp. Syst. Jan. 2018; vol. 19, No. 1; pp. 102-112.
Vegendla et al.; Investigation of Aerodynamic Influence on Truck Platooning; SAE Technical Paper; 2015.
ETSI TR 102 862; Intelligent Transport Systems (ITS); Performance Evaluation of Self-Organizing TDMA as Medium Access Control Method Applied to ITS; Access Layer Part; Dec. 2011; V1.1.1.
Search Report for European Patent Application No. 20156656.9; dated May 14, 2020.
Office Action; European Patent Application No. 20156656.9; dated Oct. 19, 2022.

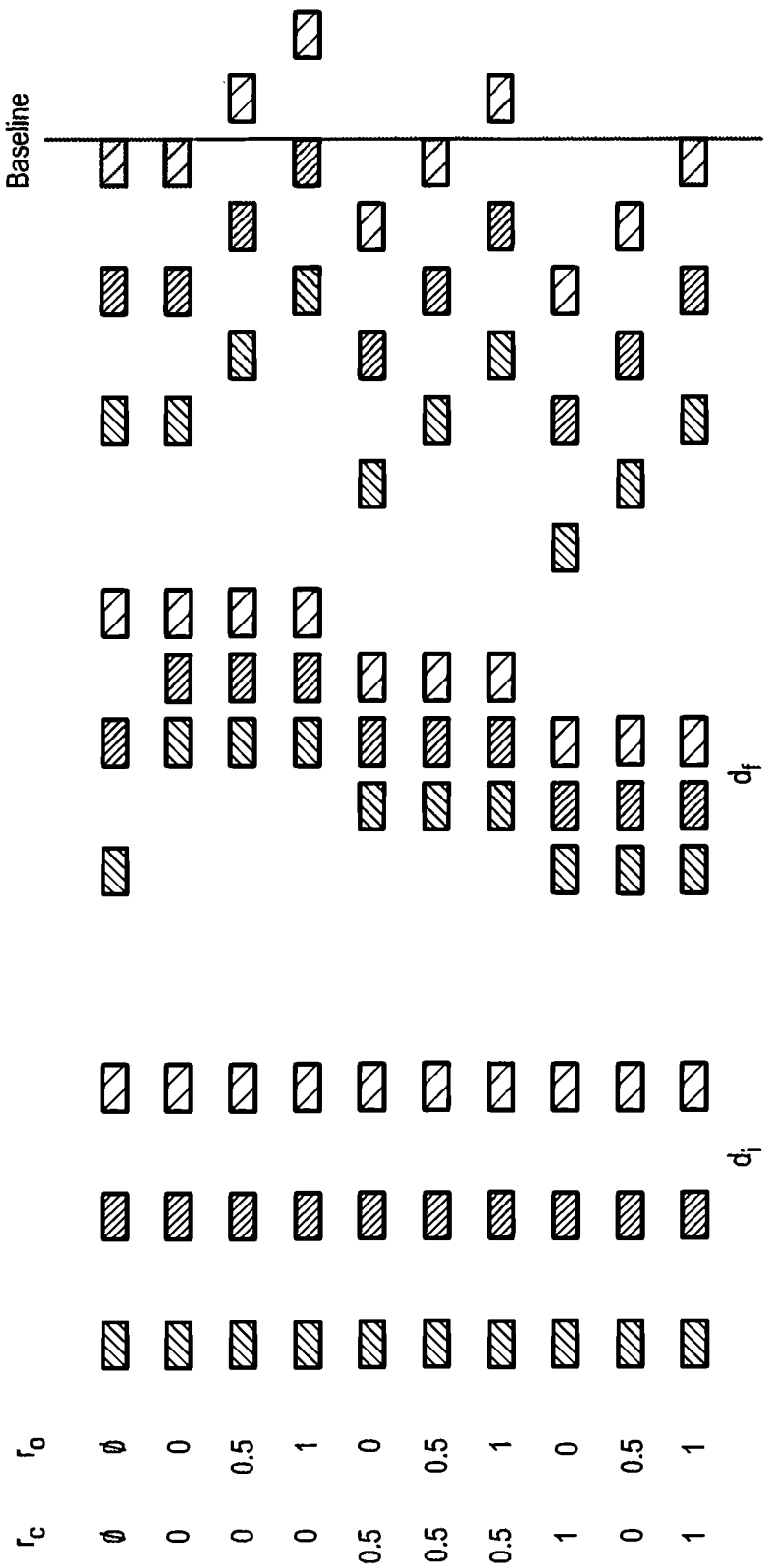

METHOD, COMPUTER PROGRAM, APPARATUS, VEHICLE, AND NETWORK COMPONENT FOR CONTROLLING A MANEUVER WITHIN A PLATOON

PRIORITY CLAIM

This patent application claims priority to European Patent Application No. 20156656.9, filed 11 Feb. 2020, the disclosure of which is incorporated herein by reference in its entirety.

SUMMARY

Illustrative embodiments relate to a method, a computer program, an apparatus, a transportation vehicle, and a network component for controlling a maneuver within a platoon of a plurality of transportation vehicles, more specifically, but not exclusively, to determining whether a platoon maneuver is justified by considering an overall fuel efficiency of the maneuver.

BRIEF DESCRIPTION OF THE DRAWINGS

Disclosed embodiments will be described with reference to the accompanying figures, in which:

FIG. 3 illustrates the concept of distance investment in an exemplary embodiment;

DETAILED DESCRIPTION

Figure 1:
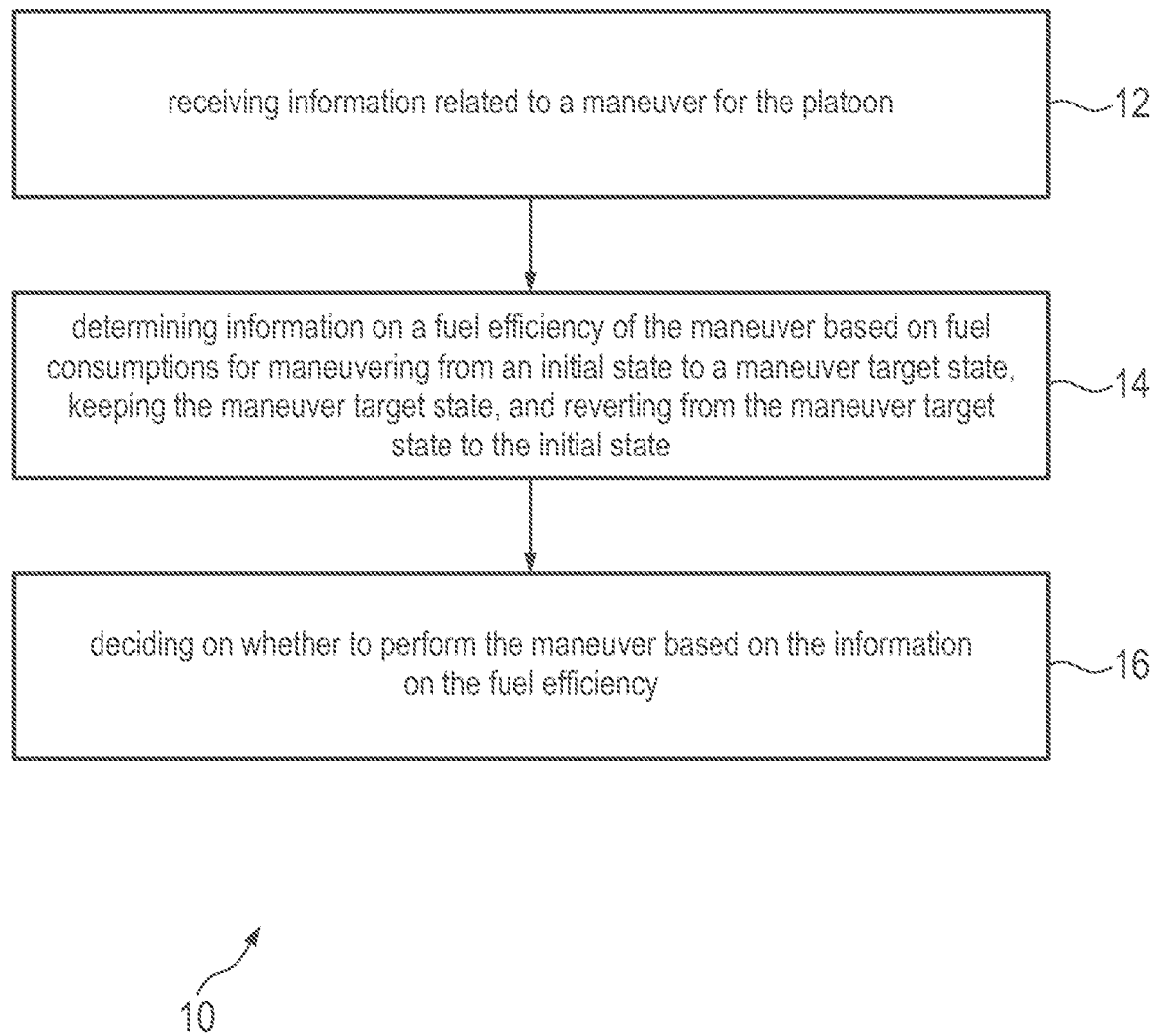
FIG. 1 illustrates a block diagram of an exemplary embodiment of a method for controlling a maneuver within a platoon.

Vehicular communication is a field of research and development. To enable an autonomous or semi-autonomous driving of the transportation vehicles, transportation vehicles are expected to use Vehicle-to-Vehicle-communication (V2V) and Vehicle-to-Network (V2N) communication, e.g., to coordinate driving maneuvers and/or to receive tele-operated driving instructions. This communication is generally wireless, i.e., transportation vehicles may wirelessly communicate with other transportation vehicles in their vicinity and/or with backend services via cellular mobile communication systems.

Automated or autonomous driving is also a field of research and development. One concept of dealing with high traffic loads is platooning, in which transportation vehicles are grouped and which may allow making more efficient use of the road capacity, lowering fuel consumption, respectively. The groups of transportation vehicles, also referred to as convoys or platoons, may be used to operate the transportation vehicles in the platoon with a short distance or headway between the transportation vehicles, as the transportation vehicles within the platoon may react within a short time delay or simultaneously. This can be achieved by control mechanisms being active between the transportation vehicles of the platoon.

Within the concept of agile quality of service adaptation (AQoSA), an application supported by a communication system adapts its settings to the foreseen quality of service (QoS). It is especially important when the application in question is a safety-related time-critical application such as high-density platooning (HDPL), where inter-vehicle distances (IVDs) are below 15 m to benefit from reduced drag force and therefore from lower fuel consumption. At this IVD, due to very low detection and reaction times required, sensor systems may need to be supported by information transmitted by other transportation vehicles. The quality of the communication link is therefore critical as the performance of the application is strongly dependent on it. For example, transportation vehicles reduce their IVD to reduce their fuel consumption. They can achieve this distance reduction thanks to good communication conditions, about which they may have been made aware in advance (Predictive Quality of Service, PQoS). However, when the QoS degrades, the IVD has to be increased again.

Document DE 10 2017 204 326 A1 provides further details on quality of service monitoring in a mobile communication system, in particular, for vehicular applications such as for platooning. Document DE 103 56 256 A1 describes a concept for quality monitoring of a radio interface. Document DE 10 2012 212 339 A1 discloses a grouping concept for transportation vehicles. Document DE 10 2016 226 050 A1 describes a concept for anticipatory pre-allocation or reservation of radio resource needed in the future to assure a certain quality of service. Document DE 10 2016 006 523 A1 discloses a concept for setting an inter-vehicle distance based on a certain traffic situation.

Liang et al.: "Heavy-Duty Vehicle Platoon Formation for Fuel Efficiency", IEEE Transactions on Intelligent Transportation Systems, IEEE, Piscataway, N.J., USA, vol. 17, no. 4, 1 Apr. 2016 (2016-04-01), pages 1051-1061, study how two or more scattered transportation vehicles can cooperate to form platoons in a fuel-efficient manner.

Fengqiao Luo et al: "Coordinated platooning with multiple speeds", Transportation Research. Part C, Emerging Technologies, vol. 90, 1 May 2018 (2018-05-01), pages 213-225, present a coordinated platooning model with multiple speed options that integrates scheduling, routing, speed selection, and platoon formation/dissolution.

Liang et al.: "When is it Fuel Efficient for a Heavy Duty Vehicle to Catch Up With a Platoon?", 7th IFAC Symposium on Advances in Automotive Control, 1 Jan. 2013 (2013-01-01), pages 738-743, study the problem of when it is beneficial for a heavy duty vehicle to drive faster to catch up and join a platoon.

Guillaume et al. "Packet Inter-Reception Time Modeling for High-Density Platooning in Varying Surrounding Traffic Density", 2019 European Conference on Networks and Communications (EUCNC), IEEE, 18 Jun. 2019 (2019-06-18), pages 187-192, relates to agile quality of service adaptation, in which an application and a communications system exchange requirements and prediction of quality of service.

There is a demand for an improved concept for controlling platoon maneuvers.

Disclosed embodiments are based on the finding that an overall fuel efficiency of a platoon maneuver can be determined based on a fuel efficiency of the maneuver target state and based on a fuel efficiency of the transitional maneuvers to and from the maneuver target state. It is another finding that there is a trade-off for the transitional maneuvers between fuel efficiency for the transitional maneuvers and the overall fuel efficiency. For example, if the maneuver is to decrease the IVD to a certain value then the IVD can be decreased by deceleration maneuvers of the transportation vehicles in front until the IVD is reached. The IVD can increased by deceleration maneuvers of the transportation vehicles in the back of the platoon. The deceleration maneuver is more fuel efficient than an acceleration maneuver. However, the overall way progress of the platoon is decreased by the deceleration maneuver, which is also taken into account by exemplary embodiments.

Disclosed embodiments provide a method for controlling a maneuver within a platoon of a plurality of transportation vehicles. The method comprises receiving information related to a maneuver for the platoon. The method further comprises determining information on a fuel efficiency of the maneuver based on fuel consumptions for maneuvering from an initial state to a maneuver target state, keeping the maneuver target state, and reverting from the maneuver target state to the initial state. The maneuver further comprises deciding on whether to perform the maneuver based on the information on the fuel efficiency. Disclosed embodiments provide efficient maneuver control in a platoon through overall fuel efficiency evaluation.

The maneuver may be a high-density platooning maneuver for which an inter-vehicle distance of the maneuver target state is determined based on a communication latency between the transportation vehicles. Maneuvers may be controlled with respect to a given time frame, e.g., a predicted time frame, and a target state, e.g., a minimum IVD given by the communication latency. Fuel inefficient maneuvers may be avoided, transitional maneuvers may be improved or even optimized regarding an overall fuel efficiency of the maneuver.

In some exemplary embodiments the method further comprises determining the inter-vehicle distance for the maneuver target state based on a predicted quality of service for inter-vehicle communication in the platoon. Disclosed embodiments may further adapt, improve, or optimize the target state based on the communication quality of the inter-vehicle communication.

The information on the fuel efficiency may be further based on an overall duration for maneuvering from an initial state to a maneuver target state, keeping/maintaining the maneuver target state, and reverting from the maneuver target state to the initial state. Subdividing the maneuver in transitional maneuvers to and from the maneuver target state may enable further improvement of the fuel efficiency and evaluation, whether an overall fuel efficiency of the maneuver justifies the maneuver as such.

The determining may comprise determining an effective time for the maneuver target state in some exemplary embodiments. The effective time may be based on the maneuvering from the initial state to the maneuver target state, the keeping of the maneuver target state, and the reverting from the maneuver target state to the initial state. Disclosed embodiments may use the effective time as an efficient model for evaluation and adapting the maneuver.

The determining may further comprise determining the information on the fuel efficiency based on the effective time for the maneuver target state and a fuel saving rate during the maneuver target state. The effective time may then model the overall maneuver in the light of a predicted quality of service in exemplary embodiments.

For example, the determining of the effective time for the maneuver target state may comprise determining an actual time for maneuvering from the initial state to the target state and a compensation time for the maneuvering from the initial state to the target state. The determining of the effective time for the maneuver target state may further comprise determining an actual time for reverting from the target state to the initial state and a compensation time for reverting from the target state to the initial state. Compensation times in exemplary embodiments may be used to model positive and negative contributions of the transitional maneuvers to the overall maneuver in an efficient way.

In some exemplary embodiments the method may further comprise evaluating different effective times for different reference points for the maneuvering from the initial state to the target state and for reverting from the target state to the initial state. A reference point may indicate a transportation vehicle in the platoon, which forms a maneuver reference for the other transportation vehicles in the platoon. For example, if the last transportation vehicle in the platoon forms the maneuver reference then all other transportation vehicles may decelerate to decrease the IVD in the platoon. Decelerating is more fuel efficient but overall travel distance of the platoon is lost. In case the leading transportation vehicle of the platoon forms the reference, all other transportation vehicles may accelerate to decrease the IVD in the platoon. Likewise, if the last transportation vehicle is the reference and the IVD is to be increased, all transportation vehicles but the last will accelerate and travel distance may be gained. Accelerating is less fuel efficient but overall travel distance of the platoon may be gained. Disclosed embodiments may take into account different transitional maneuvers using different reference transportation vehicles and thereby improve the overall fuel efficiency.

The different effective times may result in different actual times and different compensation times, wherein at least one of the compensation times is negative. Hence, some maneuvers, e.g., the acceleration maneuver with the last transportation vehicle as reference, may be considered with a negative compensation time because overall travel distance of the platoon may be gained.

The transportation vehicles of the plurality of transportation vehicles may communicate with each other using a mobile communication system. The overall duration of the maneuver may be determined by a predicted quality of service in the mobile communication system. Such a prediction may be carried out at a transportation vehicle, an infrastructure component of the mobile communication system, or may involve both. For example, statistical information on a quality of service may be available on which a prediction can be based. For example, an overall duration for the maneuver may be determined based on the predicted quality of service. The overall duration may enable an overall fuel efficiency evaluation for the maneuver.

Disclosed embodiments further provide a computer program having a program code for performing one or more of the above described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Disclosed embodiments further provide an apparatus for controlling a maneuver within a platoon of a plurality of transportation vehicles. The apparatus comprises one or more interfaces for communicating with one or more transportation vehicles of the platoon of transportation vehicles. The apparatus further comprises a control module, which is configured to carry out one of the methods described herein.

A transportation vehicle comprising an exemplary embodiment of the apparatus and a network component comprising an exemplary embodiment of the apparatus are further disclosed embodiments.

Various exemplary embodiments will now be described more fully with reference to the accompanying drawings in which some embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular disclosed embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an exemplary embodiment of a method for controlling a maneuver within a platoon. The method 10 for controlling the maneuver within the platoon of the plurality of transportation vehicles comprises receiving 12 information related to a maneuver for the platoon. The method 10 further comprises determining 14 information on a fuel efficiency of the maneuver based on fuel consumptions for maneuvering from an initial state to a maneuver target state, keeping the maneuver target state, and reverting from the maneuver target state to the initial state. The method 10 further comprises deciding 16 on whether to perform the maneuver based on the information on the fuel efficiency.

Examples of maneuvers of the platoon are an opening maneuver to add another transportation vehicle to the platoon, a closing maneuver for closing a gap of a leaving transportation vehicle, decreasing IVD to a target IVD for a certain time, etc. A platoon is a group or convoy of vehicles, e.g., transportation vehicles, cars, trucks, etc., that is coordinated. For example, the transportation vehicles may communicate with each other directly or using infrastructure of a mobile communication system. For example, the transportation vehicles of a platoon travel a common route section together and take advantage of travelling at a decreased IVD (fuel saving). At some point, maneuvers may be necessary or possible and whether such a maneuver may be beneficial or not may be determined in at least some exemplary embodiments. Disclosed embodiments determine a fuel efficiency, e.g., it may be evaluated whether an overall fuel consumption is higher or lower if a certain maneuver is carried out. Moreover, the maneuver or part of it, may be modified to make the maneuver fuel efficient. The fuel efficiency, i.e., whether more or less fuel is consumed by the platoon with the maneuver, may then form a basis to decide on whether the maneuver is performed or not.

Figure 2:
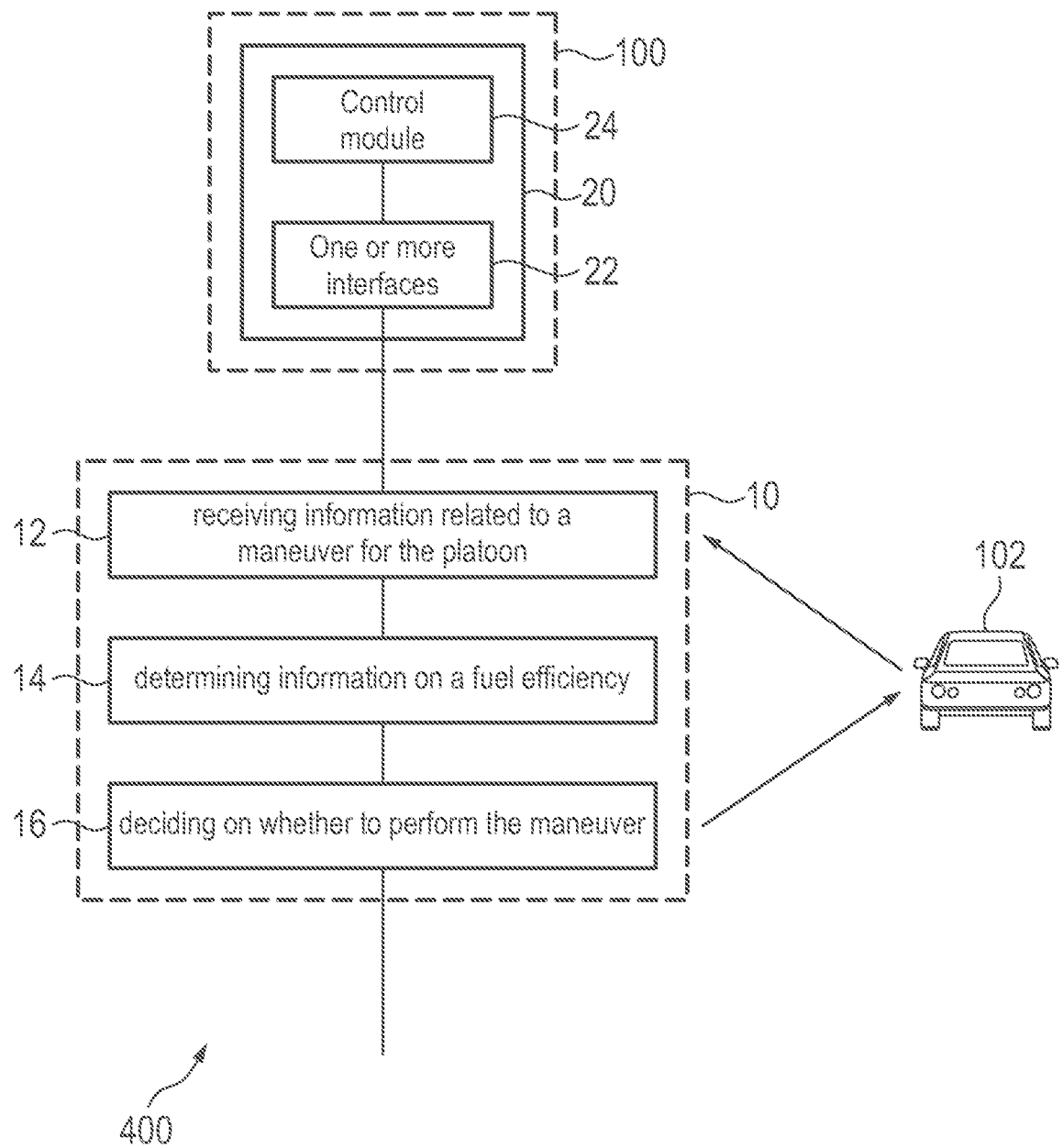
FIG. 2 illustrates a block diagram of an exemplary embodiment of an apparatus for controlling a maneuver within a platoon, and an exemplary embodiment of a transportation vehicle.

FIG. 2 illustrates a block diagram of an exemplary embodiment of an apparatus 20 for controlling a maneuver within a platoon, and an exemplary embodiment of a transportation vehicle 100. The apparatus 20 comprises at least one (one or more) interfaces 22 for communicating with one or more transportation vehicles of the platoon of the plurality of transportation vehicles. The apparatus 20 comprises a control module 24, which is coupled to the at least one interface 22. The control module 24 may be configured to control the one or more interfaces 22 and to execute any of the methods described herein. FIG. 2 further illustrates an exemplary embodiment of a transportation vehicle/network component 100 comprising an exemplary embodiment of the apparatus 20.

The apparatus 20, transportation vehicle 100 and the network component 100 may communicate through a mobile communication system 400. The mobile communication system 400, as shown in FIG. 2, may, for example, correspond to one of the Third Generation Partnership Project (3GPP)-standardized mobile communication networks, where the term mobile communication system is used synonymously to mobile communication network. The information related to the maneuver may hence be received through the mobile communication system 400, e.g., from another transportation vehicle 102 as indicated in FIG. 2. In other disclosed embodiments the request may be received from a central entity (network component), which controls the transportation vehicles 100, 102 at least to a certain extent. Likewise, the information related to the decision on whether to perform the maneuver may be provided to a transportation vehicle 102 or a network component.

The mobile or wireless communication system 400 may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component 100, such as a base station transceiver, a relay station or a UE, e.g., coordinating service provision in a cluster or group of multiple UEs/vehicles. A base station transceiver can be operable or configured to communicate with one or more active mobile transceivers/vehicles 100 and a base station transceiver can be located in or adjacent to a coverage area of another base station transceiver, e.g., a macro cell base station transceiver or small cell base station transceiver. Hence, disclosed embodiments may provide a mobile communication system 400 comprising two or more mobile transceivers/vehicles 100 and one or more base station transceivers, wherein the base station transceivers may establish macro cells or small cells, as e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a transportation vehicle etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a gNodeB, a Base Transceiver Station (BTS), an access point, a remote radio head, a relay station, a transmission point, etc., which may be further subdivided in a remote unit and a central unit.

A mobile transceiver or transportation vehicle 100, 102 can be associated with a base station transceiver or cell. The term cell refers to a coverage area of radio services provided by a base station transceiver, e.g., a NodeB (NB), an eNodeB (eNB), a gNodeB, a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. In some exemplary embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

The apparatus 20 may be comprised in a transportation vehicle, base station, a NodeB, a UE, a relay station, or any service coordinating network entity in exemplary embodiments. It is to be noted that the term network component may comprise multiple sub-components, such as a base station, a server, etc. A further exemplary embodiment is a transportation vehicle 100 comprising the apparatus 20 and/or a network component comprising the apparatus 20.

In disclosed embodiments the one or more interfaces 22 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 22 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 22 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 22 may serve the purpose of transmitting or receiving or both, transmitting and receiving, information, such as information related to capabilities, application requirements, trigger indications, requests, message interface configurations, feedback, information related to control commands, QoS requirements, QoS maps, etc.

As shown in FIG. 2 the respective one or more interfaces 22 are coupled to the respective control module 24 at the apparatuses 20. In disclosed embodiments the control module 24 may be implemented using one or more processing units, one or more processing devices, any method or mechanism for processing, such as a processor, a computer or a programmable hardware component being operable with accordingly adapted software. In other words, the described functions of the control module 24 may as well be implemented in software, which is then executed on one or more programmable hardware components. Such hardware components may comprise a general-purpose processor, a Digital Signal Processor (DSP), a micro-controller, etc.

FIG. 2 also shows an exemplary embodiment of a system 400 comprising disclosed embodiments of UE/vehicle/network component 100, and another transportation vehicle 102, it may as well comprise one or more network components/base stations comprising further exemplary embodiments of the apparatus 20. In disclosed embodiments, communication, i.e., transmission, reception or both, may take place among mobile transceivers/vehicles 100, 102 directly and/or between mobile transceivers/vehicles 100, 102 and a network component (infrastructure or mobile transceiver, e.g., a base station, a network server, a backend server, etc.). Such communication may make use of a mobile communication system 400. Such communication may be carried out directly, e.g., by Device-to-Device (D2D) communication, which may also comprise Vehicle-to-Vehicle (V2V) or car-to-car communication in case of transportation vehicles 100, 102. Such communication may be carried out using the specifications of a mobile communication system 400.

In exemplary embodiments, the one or more interfaces 22 can be configured to wirelessly communicate in the mobile communication system 400. To do so, radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc. For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

As further illustrated in FIG. 2, the method 10 may be carried out at the apparatus 20 in the transportation vehicle 100. The transportation vehicle 100 may receive information related to a maneuver for the platoon, e.g., from another transportation vehicle 102, from a controlling network component, from a platoon determining control entity, etc. The transportation vehicle or network component 100 may then determine 14 information on the fuel efficiency of the maneuver based on fuel consumptions for maneuvering from the initial state to the maneuver target state, keeping the maneuver target state, and reverting from the maneuver target state to the initial state. The transportation vehicle or network component 100 may then decide 16 on whether to perform the maneuver based on the information on the fuel efficiency.

In the following more details will be provided for some exemplary embodiments. To cope with variations on the quality of service, AQoSA provides information on the future quality of the link. This information may come with a prediction horizon, that is a delta time (a duration from now on), which ends in the future, for which the predicted value is applicable. Knowing the predicted value over time, the cost of the quality of service, the application may compute how long it needs to use the QoS to compensate the cost of the maneuver and the cost of the service in some exemplary embodiments.

A predictive quality of service (PQoS) time series is a series of values representing a future quality of the link. For example, a maneuver may comprise a closing maneuver (going from the initial inter transportation vehicle distance (IVD) of the platoon $d_i$, for instance, 30 m, to a smaller, final IVD $d_f$), maintain this final IVD $d_f$ for a while, and then perform an opening manoeuver (going back to $d_i$). This set of maneuvers is limited by the length of the favorable QoS period (the duration of future QoS during which the platoon can drive at low IVD) $T_F$.

In another disclosed embodiment the maneuver is a high-density platooning (HDPL) maneuver for which an inter-vehicle distance of the maneuver target state is determined based on a communication latency between the transportation vehicles. The inter-vehicle distance for the maneuver target state is determined based on a predicted quality of service for inter-vehicle communication in the platoon. The predicted latency for a message exchange determines a minimum IVD, e.g., based on an emergency braking maneuver. The IVD needs to provide enough time buffer for communication of an emergency brake message.

The transportation vehicles of the plurality of transportation vehicles communicate with each other using a mobile communication system, e.g., a mobile communication system enabling V2V or C2C. The maneuver is determined by a predicted quality of service (PQoS) in the mobile communication system. For example, a time horizon of the PQoS determines an overall duration of the maneuver. Hence, in the present exemplary embodiment an overall duration for the maneuver is determined based on the PQoS.

Given a PQoS time series or PQoS with a time horizon, a fuel saving for HDPL may be improved or (theoretically maximized). For example, the IVD may be reduced as fast as possible to reach the low air drag area and benefit from HDPL the longest.

Then, a fuel saving can be determined by a fuel saving rate and the time of HDPL, e.g., fuel saving=fuel saving rate*time of HDPL.

However, performing the closing and opening maneuvers requires a fuel investment (changing the IVD requires increasing/decreasing the speed, and therefore changes the fuel consumption). Disclosed embodiments may consider this finding when choosing the maneuver's strategy.

The information on the fuel efficiency may be further based on an overall duration for maneuvering from an initial state to a maneuver target state, keeping the maneuver target state, and reverting from the maneuver target state to the initial state. The determining 14 may comprise determining an effective time for the maneuver target state. The effective time may be based on the maneuvering from the initial state to the maneuver target state, the keeping of the maneuver target state, and the reverting from the maneuver target state to the initial state.

Disclosed embodiments may model a relative fuel saving (FS) as a function of the effective HDPL time (TH) and the fuel saving rate at the target distance ($c_{d_f}$).

$$F_S = c_{d_f} T_H.$$

Hence, the determining 14 comprises determining the information on the fuel efficiency based on the effective time (TH) for the maneuver target state and a fuel saving rate $c_{d_f}$ during the maneuver target state.

This notion of effective HDPL time is the HDPL time accounting for the maneuver investment in fuel and distance. For this, compensation times TC for the maneuver fuel investment can be introduced.

$$T_C = \frac{C}{c_{d_f}}.$$

Where C is the investment of one of the closing and opening maneuvers (transitional maneuvers). The determining 14 of the effective time for the maneuver target state may comprise determining an actual time for maneuvering from the initial state to the target state and a compensation time for the maneuvering from the initial state to the target state. Likewise, the determining 14 of the effective time for the maneuver target state may comprise determining an actual time for reverting from the target state to the initial state and a compensation time for reverting from target state to the initial state.

At least some exemplary embodiments may evaluate different effective times for different reference points for the maneuvering from the initial state to the target state and for reverting from the target state to the initial state. A reference point indicates a transportation vehicle in the platoon, which forms a maneuver reference for the other transportation vehicles in the platoon, as it is further detailed in FIG. 3. The different effective times result in different actual times and different compensation times, wherein at least one of the compensation times is negative. This time can be negative if the maneuver already saves fuel (e.g., all trucks decelerate to reduce the IVD).

The notion of distance investment intervenes when the closing and opening maneuvers create a distance deficit. FIG. 3 illustrates the concept of distance investment in an exemplary embodiment. FIG. 3 shows a platoon of three transportation vehicles for which at a first time instant, which is shown on the very left, the IVD is di. The first row of the matrix representation in FIG. 3 depicts the progress without conducting a maneuver. As can be seen in the middle and at the very right, the IVD of the three transportation vehicles remains constant. Starting in the second row, development over time for a HDPL maneuver is shown. The IVD is reduced to df in a closing maneuver and the result is depicted in the middle. The IVD is then increased back to di, which is shown on the right. Different reference points rc, ro are considered for the closing and opening maneuvers. Value 0 means that the leading transportation vehicle is the reference point, value 0.5 indicates that the center transportation vehicle is the reference point, and value 1 indicates that the last transportation vehicle is the references point. The different rc, ro combinations are shown on the very left. In the second row the leading transportation vehicle is the reference for both transitional maneuvers. As can be seen on the very right, after the opening maneuver the platoon made the same progress as in the first row without the maneuver. The position of the first transportation vehicle in this case is marked with a baseline. As can be seen through the combinations some maneuver configurations gain way progress and some loose way progress.

The baseline hence represents the case in which no maneuver is performed. On the left, the initial state is shown, and in the middle the HDPL (maneuver target) state is shown. On the right, the final state is shown. Compared to the baseline, some maneuvers introduce a distance deficit (first truck/transportation vehicle behind (left of) the baseline) and some a distance gain (first truck/transportation vehicle in front of (right of) the base line.

In case of a deficit, the platoon needs to drive a bit longer to compensate the baseline, with which the relative fuel saving can be computed in disclosed embodiments. In case of a gain, it means that the platoon needs to drive less afterwards, meaning that this can be translated into a fuel gain compared to the baseline. More details on how rc, ro can be obtained can be found in application EP 19 170 887.4.

This can be resumed as $T_{C_D}$, a distance compensation time accounting for the distance deficit or gain of the maneuver.

Summarizing, in disclosed embodiments the effective HDPL time $T_H$ may be obtained by $$T_H = T_F - T_{M_c} - T_{C_c} - T_{M_o} - T_{C_o} - T_{C_d}$$

where $T_F$ is the length of the favorable PQoS.

$T_{M_c}$ is the maneuvering time of the closing maneuver (from the initial state, IVD=$d_i$, to the maneuver target state IVD=$d_f$), $T_{C_c}$ is the compensation time of the fuel investment of the closing maneuver, $T_{M_o}$ is the maneuvering time of the opening maneuver (from maneuver target state IVD=$d_f$, to the initial state, IVD=$d_i$), $T_{C_o}$ is the compensation time of the opening maneuver, respectively.

For example, these times are obtained as laid out in application EP 19 170 887.4. These times are functions of the final/target IVD df, the maneuver reference, the maximal velocity deviation and other control parameters (acceleration deviation, control gain etc.).

As a result, at least some exemplary embodiments can maximize or improve the fuel saving of HDPL by solving the following $$\max_{\Gamma} \; F_S(\Gamma)$$
$$\text{s.t.} \quad d_i > d_f \geq d_m,$$
$$\Gamma = (r_c, r_o, \Delta v_c, \Delta v_o, d_f)$$

Where rc is the reference of the closing maneuver, ro is the reference of the opening maneuver, $\Delta$vc is the maximum speed deviation of the closing maneuver, $\Delta$vo is the maximum speed deviation of the opening maneuver and df is the final IVD. These parameters can be chosen so to maximize or at least improve the fuel saving. dm is the minimum IVD allowed by the PQoS.

Disclosed embodiments may maximize or improve the fuel saving by taking into account compensation times for the fuel investment of the closing and opening maneuvers, as well as the distance deficit/gain. The HDPL parameters can be chosen accordingly in exemplary embodiments.

The signaling may be implemented in a centralized or in a distributed way. For example, a transportation vehicle within the platoon may carry out the method 10 and inform/coordinate the platoon members. In other disclosed embodiments, the method 10 may be carried out at a control center in an infrastructure network component and the results may be communicated to the members of the platoon, or a coordinating member of the platoon. In further disclosed embodiments, a fully distributed implementation is conceivable in which the method 10 is carried out at least partly at each of the platoon members. Then an additional coordination or reconcilement communication may be carried out among the members of the platoon to assure corporate maneuvering.

As already mentioned, in exemplary embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

Disclosed embodiments may be summarized as follows.

A promising application in the scope of cooperative driving is high-density platooning. One of the main goals of this application is to reduce the fuel consumption by benefiting from reduced air drag from driving inter-vehicle distances below ten meters. To ensure safety at such low inter-vehicle distances, the application strongly relies on vehicle-to-vehicle communications. To support this kind of application, a recent concept is agile quality of service adaptation, in which the application is receiving a prediction of the future quality of service, from the network, for instance, and adapts its settings to cope with its variation. An important parameter in this concept is the prediction horizon, that is the length of the provided predicted quality of service time series. This parameter drives the duration of the reduced air drag benefit as a function of the maneuvering time series. Indeed, a short prediction horizon can be used, but requires fast reaction of the application. This is often linked to higher fuel consumption during the adaptation maneuver, thus impairing the original goal of high-density platooning.

The influence of the prediction horizon on the fuel saving is a function of different maneuver parameters. We first present three strategies to achieve the variation of the intervehicle distance. The relationship between the maneuvering duration and the fuel consumption for increasing and decreasing the inter-vehicle distance can be considered in exemplary embodiments. The maneuver fuel investment can be linked with a compensation time, during which the platoon will counterbalance the fuel consumption by benefiting from the reduced air drag. Some exemplary embodiments may use an optimization method for maximizing the fuel efficiency depending on some predictive quality of service (PQoS) parameters. To benefit from high-density platooning, the order of magnitude of the prediction horizon required by a five-truck platoon may be minimum one hundred seconds.

An interesting and promising application of cooperative driving is high-density platooning (HDPL). Aiming to reduce their fuel consumption, transportation vehicles in a HDPL drive small inter-vehicle distances (IVDs)—15, 10, or even 5 m. Indeed, this reduction can be achieved thanks to reduced air drag, cf. A. Al Alam, A. Gattami, and K. H. Johansson, "An experimental study on the fuel reduction potential of heavy duty transportation vehicle platooning," in 13th Int. IEEE Conf. on Intell. Transp. Syst. (ITSC), 2010. IEEE, 2010, pp. 306-311.

In recent years, truck platooning aiming for energy efficiency has gained a lot of attention in the field of cooperative transportation vehicle automation research, cf. S. Tsugawa, S. Jeschke, and S. E. Shladover, "A review of truck platooning projects for energy savings," IEEE Trans. on Intell. Veh., vol. 1, no. 1, pp. 68-77, March 2016, and S. van de Hoef, K. H. Johansson, and D. V. Dimarogonas, "Fuel-efficient en route formation of truck platoons," IEEE Trans. on Intell. Transp. Syst., vol. 19, no. 1, pp. 102-112, January 2018.

To achieve this efficiency whilst guarantying safety, the application requires the exchange of information with low latency and high reliability. The coordination between the transportation vehicles is supported by vehicle-to-vehicle (V2V), or vehicle-to-everything (V2X) communications more generally.

Safety-related time-critical applications tend to be limited by the lower-bound quality of service (QoS) of their communications systems. This can be avoided by applying a recent concept in communications systems: agile quality of service adaptation (AQoSA), cf. A. Pfadler, G. Jornod, A. El Assaad, and P. Jung, "Predictive Quality of Service: Adaptation of Inter Vehicle Distance to Packet Inter-reception Time for HDPL," in IEEE 91st Veh. Technol. Conf. (VTC Spring). IEEE, 2020, in review.

The application and the communications system periodically exchange QoS requirements and PQoS, respectively. On the application side, the adaptation of the QoS requirements operate together with the adaptation of its functional settings.

Applied to HDPL, AQoSA allows the platoon to plan its maneuver. This includes reducing its IVD, maintaining the small IVD and increasing the IVD. This planning strongly depends on the QoS provided by the communication systems. The values in the PQoS time series drive the minimum IVD, which affects the fuel saving. Its length will also affect the fuel saving, as the longer the favorable time, the larger the fuel saving. To achieve fuel saving, the duration of this favorable QoS should be longer than a threshold. Depending on the strategy chosen by the application, the requirements on the QoS may differ, especially in terms of prediction horizon.

This prediction horizon is defined as the total length of the PQoS timeseries. Therefore, in a HDPL maneuver, it may encompass the IVD reduction (closing) maneuver, the reduced air drag period as well as the IVD increase (opening) maneuver and some compensation times.

The challenges of PQoS in this scope are two-fold: (i) the application needs to choose an efficient strategy depending on the provided PQoS timeseries; (ii) the efficiency of the strategy can only be assessed if the PQoS timeseries is long enough. To cope with these challenges, a method for efficient strategy conception may be used in disclosed embodiments. Moreover, the requirement on the prediction horizon may be precisely derived.

The relationship between the control strategy and two objectives of the system may be considered in disclosed embodiments, the fuel consumption and the maneuvering time. To do so, an exemplary embodiment may provide a concept for group control, the relative reference for the maneuver, along with other relevant control parameters. The reference concept may extend the graph-based Laplacian control algorithm presented in I. Navarro, F. Zimmermann, M. Vasic, and A. Martinoli, "Distributed graph-based control of convoys of heterogeneous transportation vehicles using curvilinear road coordinates," in 19th IEEE Int. Conf. Intell. Transp. Sys. (ITSC), 2016, pp. 879-886, for the closing and opening maneuvers. In following simulations results will be presented, the simulations use SUMO P. A. Lopez, M. Behrisch, L. Bieker-Walz, J. Erdmann, Y.-P. Flötteröd, R. Hilbrich, L. Lücken, J. Rummel, P. Wagner, and E. Wießner, "Microscopic traffic simulation using SUMO," in 21st IEEE Int. Conf. Intell. Transp. Syst. IEEE, 2018, and G. F. Riley and T. R. Henderson, The ns-3 Network Simulator. Berlin, Heidelberg: Springer Berlin Heidelberg, 2010, pp. 15-34, using IEEE 802.11p radio access technology, "Intelligent Transport Systems (ITS); Performance evaluation of selforganizing TDMA as medium access control method applied to ITS; Access layer part," European Telecommunications Standards Institute, Tech. Rep. ETSI TR 102 862 V1.1.1, 2011.

The simulated truck platoon may obtain the PQoS information from a prediction algorithm running on an arbitrary node.

The impact of various external factors on the performance HDPL supported by different radio access technologies have been studied. These factors are the number of surrounding nodes and the inter-antenna distance in G. Jornod, T. Nan, M. Schweins, A. El Assaad, A. Kwoczek, and T. Kürner, "Sidelink technologies comparison for highway high-density platoon emergency braking," in 2018 IEEE 16th Int. Conf. Intell. Transp. Syst. Telecommun. (ITST), October 2018, pp. 1-7, and the Doppler shift originating from incoming traffic in G. Jornod, R. Alieiev, A. Kwoczek, and T. Kürnmer, "Environment-aware communications for cooperative collision avoidance applications," in 2018 IEEE 19th Int. Symp. "A World of Wireless, Mobile and Multimedia Networks" (WoWMoM), June 2018, pp. 588-599, and R. Alieiev, G. Jornod, T. Hehn, A. Kwoczek, and T. Kürnmer, "Improving the performance of high-density platooning using transportation vehicle sensorbased dopplercompensation algorithms," IEEE Transactions on Intelligent Transportation Systems, pp. 1-12, 2019.

These studies may motivate the development of strategies for the adaptation of QoS variation. The prediction algorithm that provides the PQoS could run on a base station, or be running on the nodes, such as in G. Jornod, A. El Assaad, A. Kwoczek, and T. Kürnmer, "Packet interreception time modeling for high-density platooning in varying surrounding traffic density," in 28th IEEE Eur. Conf. Net. Commun. IEEE, 2019, accepted.

The fuel consumption model of SUMO may be adapted to reflect the air drag reduction. A Pareto frontierlike relationship between the two objectives may be derived. Using the air drag corrected fuel consumption model, the fuel consumption investment can be translated into a compensation time. The resulting sets of maneuvering time/compensation time for the two maneuvers allow performing fuel saving optimization or improvement depending on the available PQoS. Disclosed embodiments may extend the distributed graph-based feedback convoy controller for closing and opening maneuvers; consider the relationship between fuel consumption and maneuvering time depending on the control strategy and improve or optimize the fuel saving depending on the PQoS.

In the following a scenario considered in exemplary embodiments will be introduced and the used control model. The methodology to evaluate the relationship between fuel consumption and maneuvering time for HDPL in some exemplary embodiment will be detailed. Numerical results will be presented and discussed. The required prediction horizon for a given timeseries may be derived in disclosed embodiments.

Disclosed embodiments may provide a fuel-efficient approach for HDPL using PQoS. This may require deriving the relationship between maneuvering time and fuel consumption through the simulation of a HDPL scenario. Indeed, to compute the time required to have actually achieve fuel saving, the maneuvers have to be accounted for. The closing and opening maneuvering times have to be deduced from the future favorable QoS time series. Moreover, if the maneuvers consume fuel, exemplary embodiments may also account for its compensation by deducting compensation times. The sum of the maneuvering times and the compensation times therefore drives the PQoS prediction horizon. Another important feature for this approach is the development of a control strategy for the two maneuvers involved.

Figure 4A:
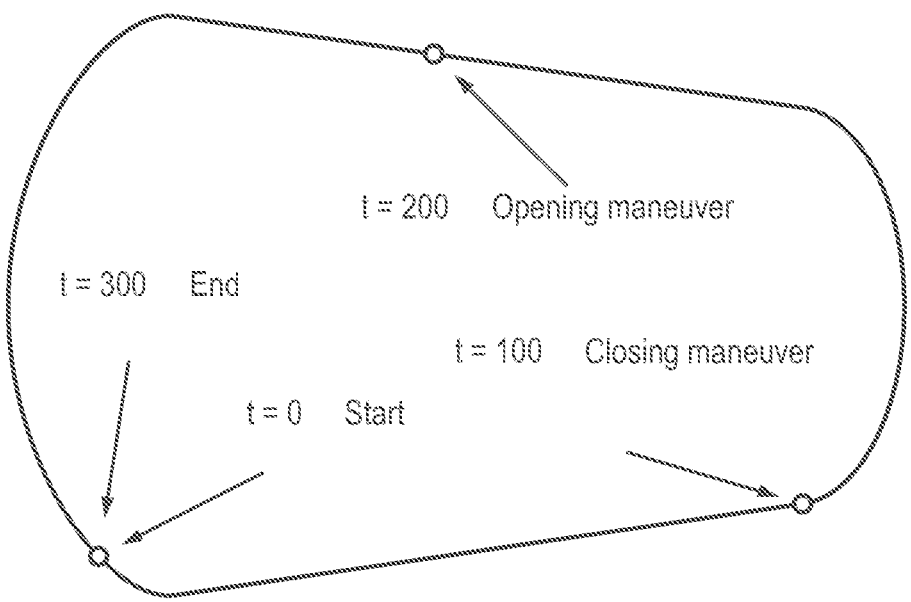
FIG. 4a illustrates a scenario snapshot showing a simulation model of a test track facility.
Figure 4B:
FIG. 4b illustrates a scenario snapshot showing a zoom in on a five-truck platoon in an exemplary embodiment.

To derive the prediction horizon requirement on AQoSA, a standardized platooning scenario on a closed circuit is considered. This allows running the same scenario, independent on the actual maneuvering time, assuming that the platoon will achieve the formation changes in the imparted time. A scenario is divided in five phases: (i) platooning; (ii) IVD reduction; (iii) HDPL; (iv) IVD augmentation and (v) platooning. In the first phase (i), the platoon targets an IVD related to a normal platooning use-case, for instance, 30 m. It is then assumed that the platoon receives an information on a future favorable QoS and triggers the reduction of the IVD (ii) to reduce the drag force experienced by the follower transportation vehicles, aiming to reduce the overall fuel consumption. During the HDPL phase (iii), the platoon targets an IVD of 5 m. The platoon is then made aware of a degradation of the QoS and triggers the increase of the IVD (iv). When the maneuver is achieved, that is when the IVD is back to its original value, the platoon continues to drive (v). In an exemplary embodiment a platoon is composed of five trucks, driving on the test circuit, as illustrated in FIG. 4. FIG. 4 illustrates scenario snapshots: (a) simulation model of a test track facility, and (b) zoom in on the five-truck platoon in this disclosed embodiment.

The scenario is divided into three periods of 100 s: (i); (ii-iii); and (iv-v). The actual durations of the phases (ii) to (iv) depend on the maneuvering strategies implemented and are results of these experiments. In addition to enabling a standardized experimental process, the phases (i) and (iii) provide stabilization periods. The data gathered in this time-triggered implementation allows developing strategies to process actual PQoS time series. Each experiment indeed yields two maneuvering times and two maneuvering fuel consumptions.

For this study, the longitudinal controller presented in I. Navarro, F. Zimmermann, M. Vasic, and A. Martinoli, "Distributed graph-based control of convoys of heterogeneous transportation vehicles using curvilinear road coordinates," in 19th IEEE Int. Conf. Intell. Transp. Sys. (ITSC), 2016, pp. 879-886, for IVD adaptation is extended in terms of maneuver time and fuel efficiency. The benefit of this control strategy compared to classical cooperative adaptive cruise control (CACC) is that the formation is more robust to unstable communication links. A first study of the requirements on the communication system using this control strategy for emergency braking is presented in I. Llatser, G. Jornod, A. Festag, D. Mansolino, I. Navarro, and A. Martinoli, "Simulation of cooperative automated driving by bidirectional coupling of transportation vehicle and network simulators," in IEEE Intell. Veh. Symp. (IV), 2017, pp. 1881-1886.

In exemplary embodiments a distributed control algorithm is based on the Laplacian control principle, cf. M. Mesbahi and M. Egerstedt, Graph theoretic methods in multiagent networks. Princeton University Press, 2010, vol. 33.

Each transportation vehicle computes its target speed using the following equation:

$$\dot{s} = -\mathcal{L}(s-b) + v_g,\qquad(1)$$

where s is the position vector in the Frenet-Serret frame, b the bias vector that defines the formation and $v_g$ a vector composed of the scalar target group speed. L is the Laplacian matrix, defined as:

$$\mathcal{L} = \mathcal{I} \cdot W \cdot \mathcal{I}^T,\qquad(2)$$

where I and W are, respectively, the incidence and the weight matrices of the graph composed by the vehicular ad hoc network (VANET). The nodes of this graph are the transportation vehicles, and its edges the communication links.

Figure 5A:
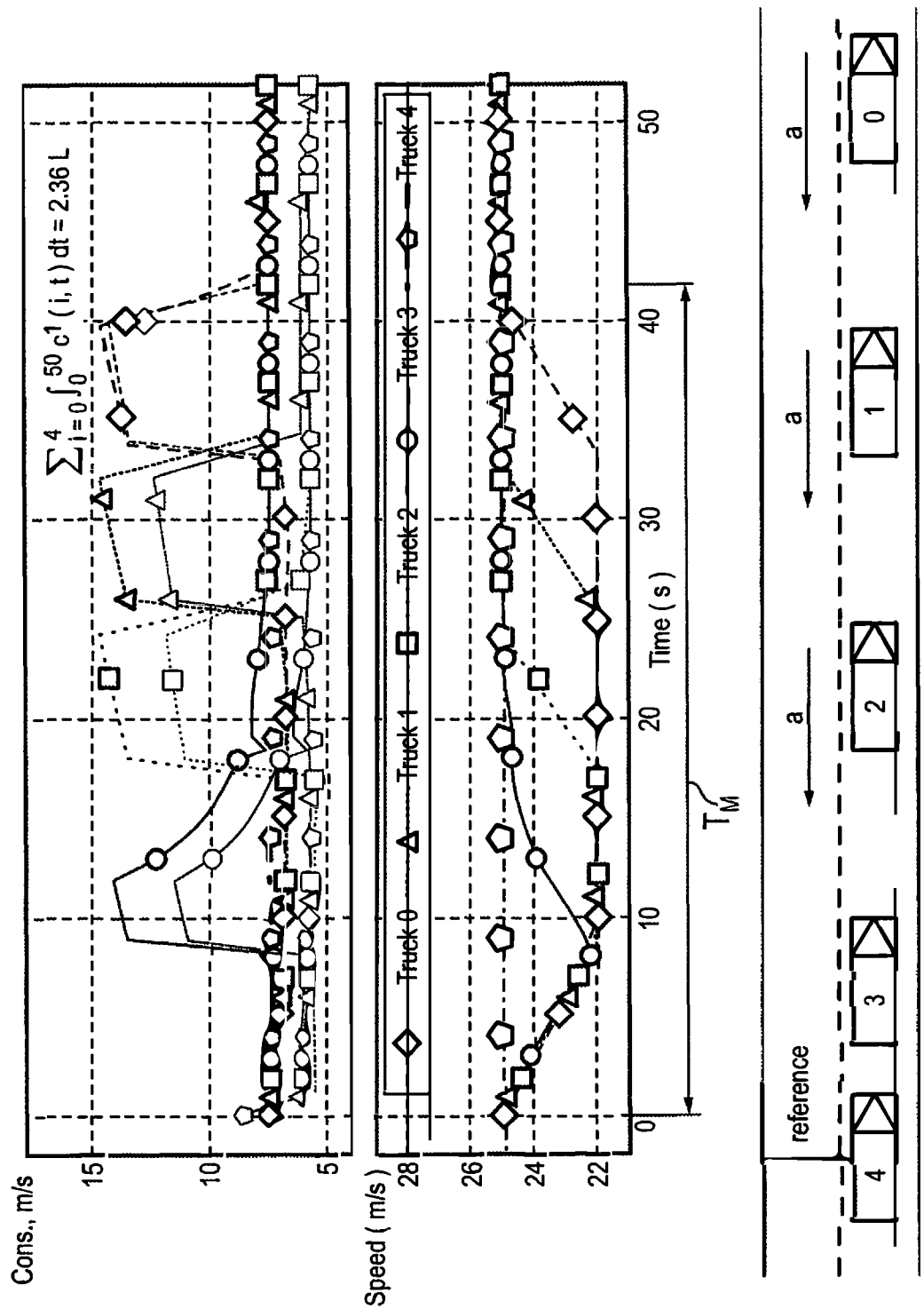
FIG. 5a illustrates reference placement in exemplary embodiments for fuel consumption optimization with reference in the back.
Figure 5B:
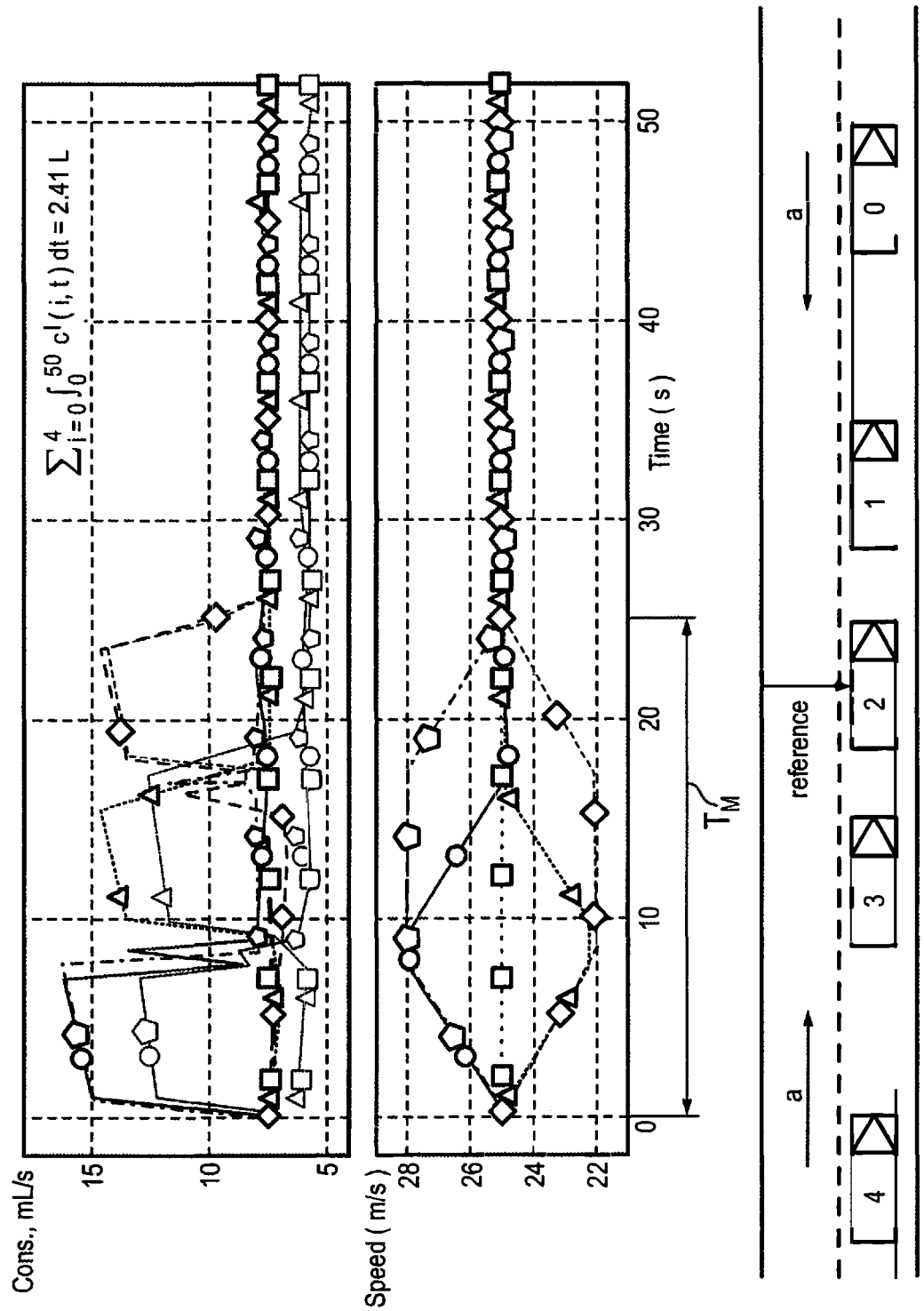
FIG. 5b illustrates reference placement in exemplary embodiments for maneuver duration optimization with reference at the center.
Figure 5C:
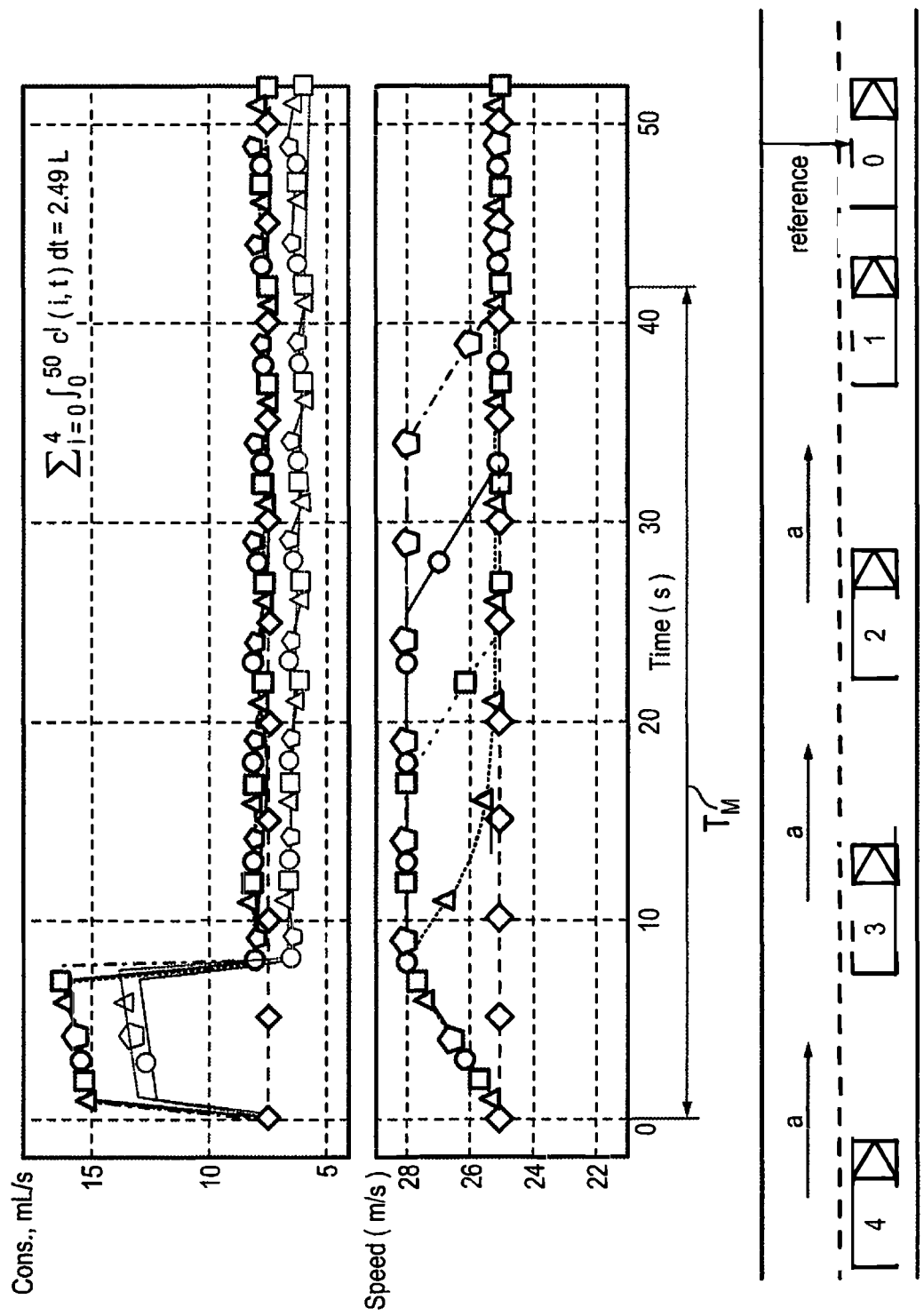
FIG. 5c illustrates reference placement in exemplary embodiments compared to classical reference in the front during an IVD closing maneuver.

Disclosed embodiments may enhance the offset and bias mechanisms. In the original algorithm presented in Navarro, F. Zimmermann, M. Vasic, and A. Martinoli, "Distributed graph-based control of convoys of heterogeneous transportation vehicles using curvilinear road coordinates," in 19th IEEE Int. Conf. Intell. Transp. Sys. (ITSC), 2016, pp. 879-886, the offset and bias are calculated with respect to the reference transportation vehicle, which is the front transportation vehicle. This definition is appropriate for the creation and the maintenance of the convoy, even more when it is composed of heterogeneous transportation vehicles. When it comes to the modification of the IVD, it is interesting to optimize the position of this reference point depending of the maneuver performed—increasing or decreasing the IVD—, aerodynamics parameters and the optimization objective. Indeed, on the one hand, having the reference in the middle of the platoon divides by two the maneuvering time. On the other hand, it is more fuel efficient to have it behind when decreasing the IVD and in the front when increasing it. FIG. 5 illustrates simple examples of combination of objectives and maneuvers.

FIG. 5 illustrates reference placement in exemplary embodiments for (a) fuel consumption optimization with reference in the back, (b) maneuver duration optimization with reference at the center, compared to (c) classical reference in the front during an IVD closing maneuver. For each reference example, FIG. 5 comprises the fuel consumption time series, the speed time series and an illustration of the reference influence on the maneuver. In the fuel consumption time series, plain curves represent the instantaneous consumption without air drag consideration. The overall consumption of the platoon over the 50 s experiment is also given in the top right corner. Instantaneous fuel consumption considering the air drag reduction induced by preceding transportation vehicles are represented by low opacity curves. In the speed time series, the maneuvering time TM is indicated. In the reference illustrations (third for each subsection), the direction of driving is from left to right and the horizontal arrows represent the direction of the acceleration.

In the following variable parameters used to evaluate the relationship between fuel consumption and maneuvering time in an exemplary embodiment are described. The computation methods for these two objectives in an exemplary embodiment are then described before presenting the fuel consumption model evaluation that is used to highlight the benefit of HDPL.

In some disclosed embodiments a control strategy has three independent features: (i) the platooning controller, (ii) the local controller and (iii) the command input verification. The platooning controller, which enables the group behavior, is described subsequently. The local controller translates the speed received from the platooning controller into an acceleration command. Finally, the command input verification ensures that the speed and acceleration commands do not violate the dynamics constraints.

Figure 6:
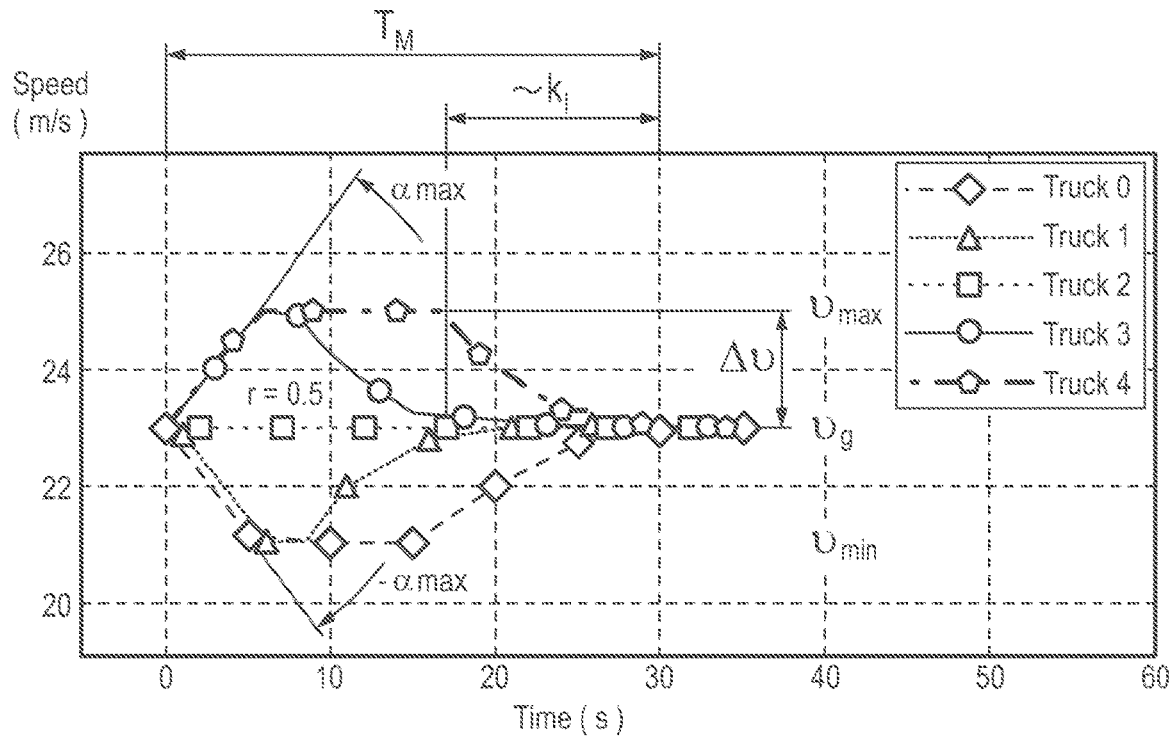
FIG. 6 illustrates platoon input parameters and time objective in an exemplary embodiment.

FIG. 6 illustrates platoon input parameters and time objective in an exemplary embodiment. The maneuver to which these speed profiles correspond takes the center truck as reference, therefore r=0.5. The influence of the control gain kl is depicted for trucks 0 and 4. The speeds and accelerations are bounded to $v_g \pm \Delta v$ and $\pm a_{max}$ respectively. The maneuvering time, though defined by a deviation threshold, can be also observed in FIG. 6.

FIG. 6 illustrates the parameters described in the following with the speed profile of an IVD change. Different platooning strategies may be applied in disclosed embodiments that allow to achieve trade-offs between the two objectives. Three example strategies are front, center and back references, further referred as $r \in \{0, 0.5, 1\}$, respectively, in a platoon with an odd number of transportation vehicles. This variable is used to find the reference transportation vehicle index as $r \cdot (N_v - 1)$, with $N_v$ the number of transportation vehicles in the platoon (the numbering starts with 0). In the general case, the reference point is not restricted to a transportation vehicle and can be placed anywhere within the platoon.

The control gain is a parameter of the local controller and dictates how tolerant the algorithm is with differences between the current formation and the target formation. A larger control gain kl, within a reasonable value interval, will achieve faster maneuver, at the cost of a potentially larger fuel consumption.

The transportation vehicles in the platoon have inherent dynamical limitations, such as maximal speed and acceleration capabilities, arising from their mechanical properties. On top of these, some maximal and minimal speeds around the target platoon speed are imposed, as well as maximal and minimal accelerations. These two sets of parameters dictate the shape of the velocity profile during the maneuver in terms of height of the plateau and slope of the speed increase and decrease. To reduce the complexity of the problem, symmetrical values are used around the target speed vg=25 m/s, vg±Δv, and around 0 m/s2±amax. The two parameters have different influences on the objectives. For instance, sharp accelerations have a relative high cost in terms of fuel consumption, but reduce the speed changing time. Moreover, a small speed operating area limits the consumption during the acceleration phase but yields a longer maneuver.

Some exemplary embodiments may aim at two objectives, minimizing the maneuver time and minimizing the fuel consumption. The former is of interest for the communications system, as it drives the prediction horizon for PQoS. The latter is an inherent objective of the platooning system, reducing fuel consumption.

1) Maneuver Duration: The maneuver time, Tm, can be defined as the duration between the trigger of the IVD change (Tt) and the time at which the target is reached. This happens when:

$$\max(\zeta_i) \leq \varepsilon,$$

where $$\zeta_i = \overline{|s-b|} \zeta i$$

Figure 7:
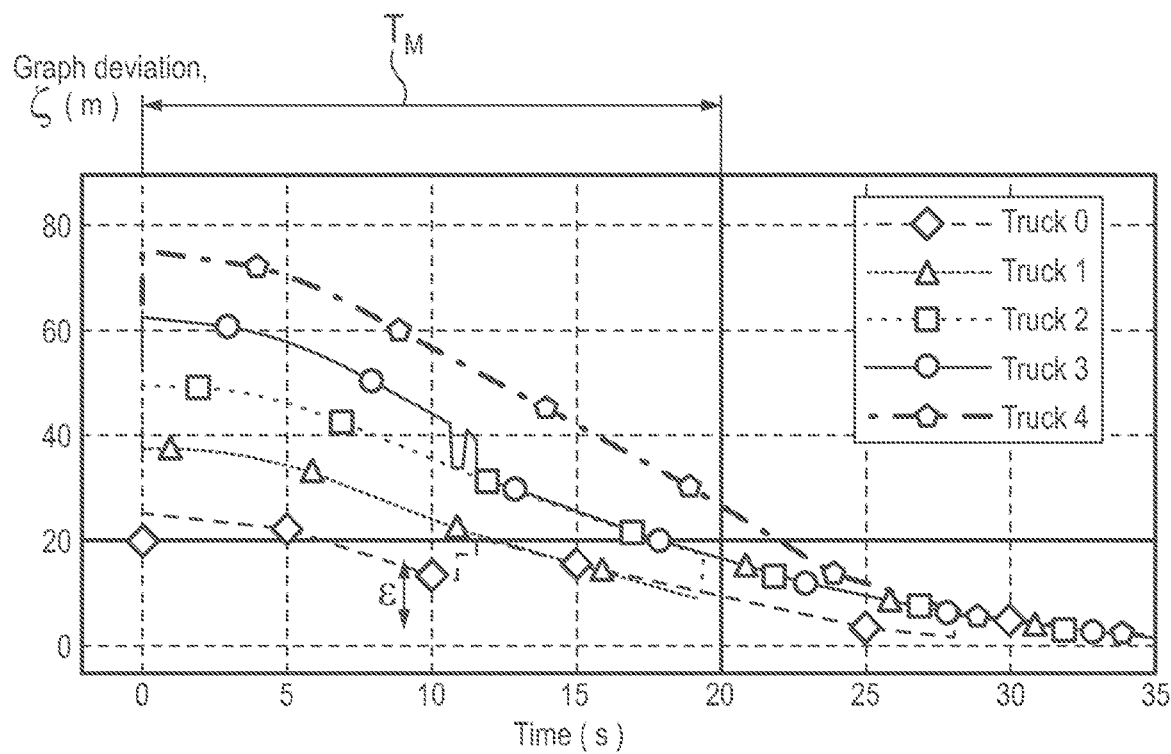
FIG. 7 illustrates a graph deviation as a function of time and derivation of Tm, the maneuver duration in an exemplary embodiment.

(see Eq. (1)) for the local graph of node i and ε is a tolerance value, 1 m in the presented results. $\zeta_i$ is related to the mean deviation between the IVD and the target IVD for each transportation vehicle. The derivation of the duration is illustrated in FIG. 7. FIG. 7 illustrates a graph deviation as a function of time and derivation of $T_m$, the maneuver duration in an exemplary embodiment. The value of ε has been exaggerated for representation purposes.

The surges that can be observed, for instance, for trucks 0 and 3 around 12 s correspond to changes in the nodes number in the local graphs, typically increasing in an IVD reduction maneuver. The maneuver duration is also represented in FIG. 6, as the stabilization of the truck speeds also corresponds to the achievement of the target formation.

2) Maneuver Cost: The maneuver cost, C, is the total fuel consumption of the platoon during the maneuver, expressed as a difference with the consumption of the same platoon not performing the maneuver. Each parameter's set is therefore applied a second time to obtain the baseline. In some disclosed embodiments the relative fuel consumption is therefore computed as:

$$C_{i,k} = \int_0^{T_m} c_{i,k} dt \quad k \in \{m, b\} \tag{3}$$

$$C_k = \sum_{i=0}^{N_s-1} C_{i,k} \tag{4}$$

$$C = C_m - C_b, \tag{5}$$

where C is the relative maneuver cost, $C_k$ the total fuel consumption during the maneuver, with $C_m$ and $C_b$ corresponding to the maneuver and the baseline respectively.

Similarly, Ci,k and ci,k are the total and instantaneous fuel consumption for truck i. To compute the instantaneous consumption of the trucks, some disclosed embodiments rely on the fuel consumption model of the traffic simulator SUMO, HBEFA3/HDV_TT, described in S. Hausberger and D. Krajzewicz, "COLOMBO Deliverable 4.2: Extended Simulation Tool PHEM coupled to SUMO with User Guide," February 2014.

It is then corrected for the air drag gain using the drag force model and the recorded timeseries for fuel consumption, speed, acceleration and IVD.

In the following, a fuel consumption model as used in some disclosed embodiments for HDPL will be described in more detail. The expected gain of truck platooning is a decreased overall fuel consumption. It is enabled by the reduced air drag experienced by each platoon member. Fuel consumption models integrated in microscopic vehicular simulators generally take into account individual transportation vehicle parameters such as speed and acceleration. In a HDPL system, the air drag experienced by a truck is also strongly dependent on the other platoon members. As a result, an air drag correction strategy can be developed, taking as inputs for each truck:

(i) the fuel consumption considering individual air drag;
(ii) the IVDs; and
(iii) the position within the platoon.

First, the model presented by Alam et al. in [1], [17] A. Al Alam, A. Gattami, and K. H. Johansson, "An experimental study on the fuel reduction potential of heavy duty transportation vehicle platooning," in 13th Int. IEEE Conf. on Intell. Transp. Syst. (ITSC), 2010. IEEE, 2010, pp. 306-311, and A. El Alam, "Fuel-efficient heavy-duty transportation vehicle platooning," Ph.D. dissertation, KTH Royal Institute of Technology, 2014, can be linearized, which highlights the relationship with the HDPL system parameters. Second, it is explained how the input timeseries is processed to consider the reduced air drag.

Finally, the corrected fuel consumption is obtained, that can be used in the above equation (3). The model from Alam contains environmental as well as truck specific parameters:

$$m \cdot a = F_{traction} - F_{roll} - F_{gravity} - F_{airdrag} - F_{brake}, \tag{6}$$

with the acceleration a and the transportation vehicle mass m. Note that it is assumed that active traction and braking forces cannot be experienced simultaneously. The rolling resistance force, impact of gravity and air drag are given by:

$$F_{roll} = c_r \cdot m \cdot g \cdot \cos(\Theta)), \tag{7}$$

$$F_{gravity} = m \cdot g \cdot \sin(\Theta). \tag{8}$$

$$F_{airdrag} = 0.5 \cdot c_D \cdot A_a \cdot \rho_a \cdot v^2 \cdot \phi(d), \tag{9}$$

where $c_r$, g and $\Theta$ are the rolling resistance coefficient, gravitational constant, and road grade, respectively. Moreover, $c_D$ is the air drag coefficient, $A_a$ the maximal cross-section area of the transportation vehicle and ρ the air density. Note that because Θ is null in our simulation setup, $F_{gravity}$ is also null. For the sake of generality, it is continued to denote it in the following. The non-linear air drag ratio φ is at the essence of the fuel saving. $\phi(d): \mathbb{R}_+ \to (0,1]$ is a function of the IVD, but also considers the position of the transportation vehicle within the platoon. φ→0 when no drag force is experienced, φ=1 when the transportation vehicle does not benefit from reduced air drag due to preceding trucks. Its derivation is presented in P. Vegendla, T. Sofu, R. Saha, M. M. Kumar, and L.-K. Hwang, "Investigation of aerodynamic influence on truck platooning," SAE Technical Paper, Tech. Rep., 2015.

As a result, the instantaneous air drag corrected fuel consumption ci,k can be expressed as:

$$c_{i,k} = c_{i,k}^I + c_{i,k}^S. \quad (10)$$

$c_{i,k}^I$ is the instantaneous fuel consumption only considering individual transportation vehicles, i.e., with constant air drag φ=1, $c_{i,k}^S$ is the saving from the IVD related air drag:

$$c_{i,k}^I = ma + F_{roll} + F_{gravity} + F_{airdrag}|_{\phi=1} \quad (11)$$

$$c_{i,k}^S = 0.5 \cdot c_D \cdot A_a \cdot \rho_a \cdot v^2 \cdot (\phi(d) - 1). \quad (12)$$

Figure 8:
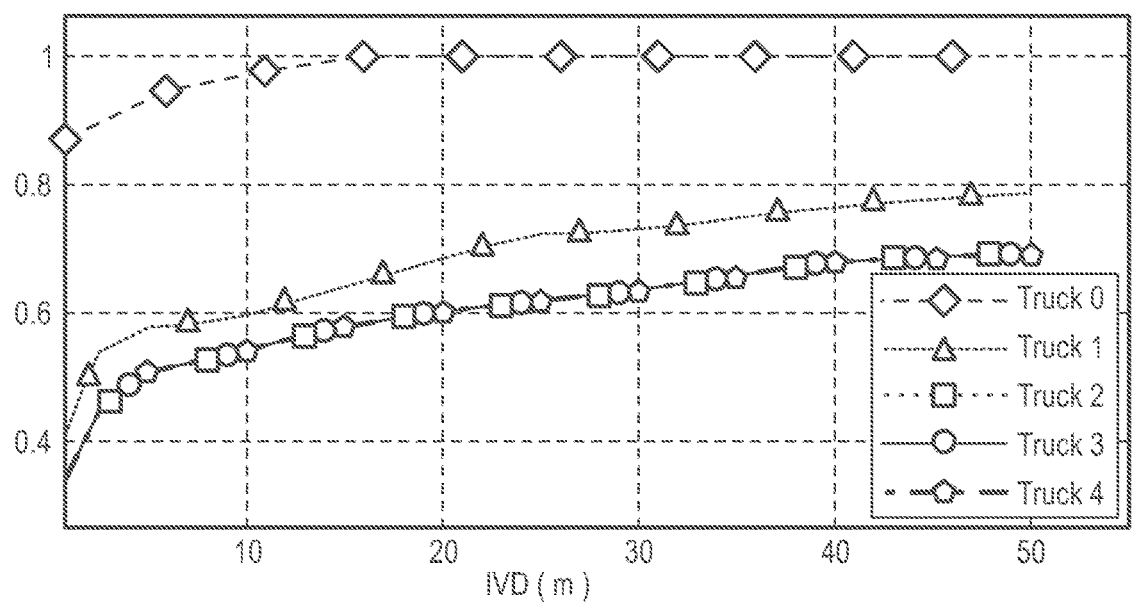
FIG. 8 illustrates an air drag ratio as a function of IVD for five trucks in a platoon in an exemplary embodiment.

In (12), φ is obtained by linking the IVD, position in the platoon and speed to the table of air drag ratios provided in H. Wolf-Heinrich and S. R. Ahmed, "Aerodynamics of road transportation vehicles," Society of Automotive Engineers, 1998, and illustrated by FIG. 8. FIG. 8 illustrates an air drag ratio as a function of IVD for five trucks in a platoon in an exemplary embodiment. It is assumed that the fourth and fifth trucks experience the same ratio as the third one. An air drag ratio of 1 corresponds to the truck driving alone, that is experiencing no benefit from other platooning trucks.

Figure 9:
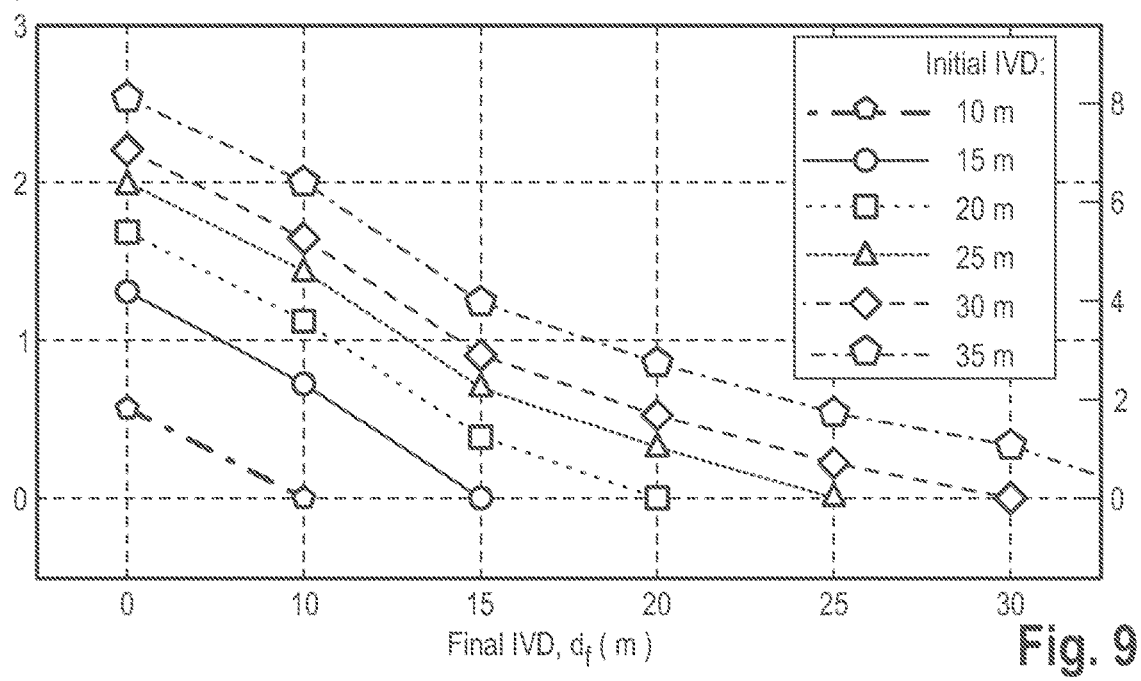
FIG. 9 shows a relative fuel saving as a function of the final IVD for various initial IVDs in exemplary embodiments.

Note that due to $\phi(d_r)-1$, $c_{i,k}^S \leq 0$. $c_{i,k}^I$ and ci,k illustrated in FIG. 5, with plain and transparent curves respectively. $c_{i,k}^S$ is then the vertical distance between the corresponding curves. The gain of HDPL can be investigated and different maneuvers can be compared by using the relative cost function as introduced in equation (5). Using this model, the net gain of performing HDPL with five trucks can be computed depending on the initial and final distances and the results are reported in FIG. 9. FIG. 9 shows a relative fuel saving as a function of the final IVD for various initial IVDs in disclosed embodiments. An approximate correspondence in percentage is given as secondary axis.

Particularly, performing HDPL at 5 m in comparison with platooning at 30 m is 2.2 mL/s with five trucks. These values will be used to calculate a compensation time for the maneuver fuel investment in the next sections. This subsequently allows to transform fuel investments to compensation times and vice versa. This is particularly useful when it comes to optimizing for both objectives: minimizing the fuel consumption and the maneuvering times.

Simulation parameters will be described first. Two sets of experiments will be performed. The first one allows to closely study the relationship between maneuver duration and fuel consumption for one combination of initial and final IVDs. The impact of the fuel consumption on this relationship is also studied. Using the insights gathered with these results, the relationship for multiple combinations of initial and final IVDs can be generalized.

The HDPL scenario can be run with a coupled traffic and network simulator, with SUMO and ns-3. The control strategies implemented are described in the previous section directly in ns-3. Leveraging the tracing capabilities of ns-3, instantaneous IVD, speed, fuel consumption and graph deviation time series can be gathered for combinations of the control parameters.

In a first phase, the impact of the control parameters can be studied for a specific combination of initial and final IVDs. In a second phase, the insights gathered can be used in the first phase to extend the results to multiple combinations of initial and final IVDs. These parameters are summarized in Table 1 below, yielding a total of 1800 experiments, including the baselines.

| Phase | Parameter | Notation | Values | Unit |
|---|---|---|---|---|
| I&II | Platoon speed | vg | 25 | m/s |
| I&II | Reference | r | 0, 0.5, 1 | — |
| I | Speed boundaries | vg ± Δv | vg ± {1, 2, 3} | m/s |
| I | Acc. boundaries | ±amax | ±{0.4, 0.7, 1.1} | m/s² |
| I | Gain | k1 | {0.75, .875, . . . , 1.25} | — |
| I | Initial IVD | di | 30 | m |
| I | Final IVD | di | 5 | m |
| I | Repetitions | — | 10 | — |
| II | Speed boundaries | vg ± Δv | vg ± {1, 1.5 , . . . , 3} | m/s |
| II | Acc. boundaries | ±amax | ±1 | m/s² |
| II | Gain | k1 | 1 | — |
| II | Initial IVD | di | {10, 15, 20, 25, 30} | m |
| II | Final IVD | di | {5, 10, 15, 20, 25} | m |
| II | Repetitions | — | 3 | — |

Then these time series are processed to obtain the total fuel consumption and the maneuvering time. It is chosen to set the target platoon speed to 23 m/s=90 km/h for it allows to provide a fair comparison with a realistic baseline. Indeed, multiple trucks driving with IVDs of 30 m at 90 km/h a situation that can be observed on highways. It has the drawback of creating situations where the truck speed overreaching the maximum legal speeds in some countries. Considering that automated driving with IVDs of 5 m is also not yet allowed, these results are provided for the purpose of revealing the potential of HDPL.

Some exemplary embodiments derive strategy choices for the closing and opening maneuvers depending on the PQoS time series. This choice is driven by two concurrent objectives, the minimization (reduction) of the fuel consumption and of the maneuvering time. Indeed, for the overall problem, the longer the maneuver, the higher the risk of having to perform an earlier and faster opening maneuver. The risk is higher because of the low confidence in the provided PQoS.

Figure 10A:
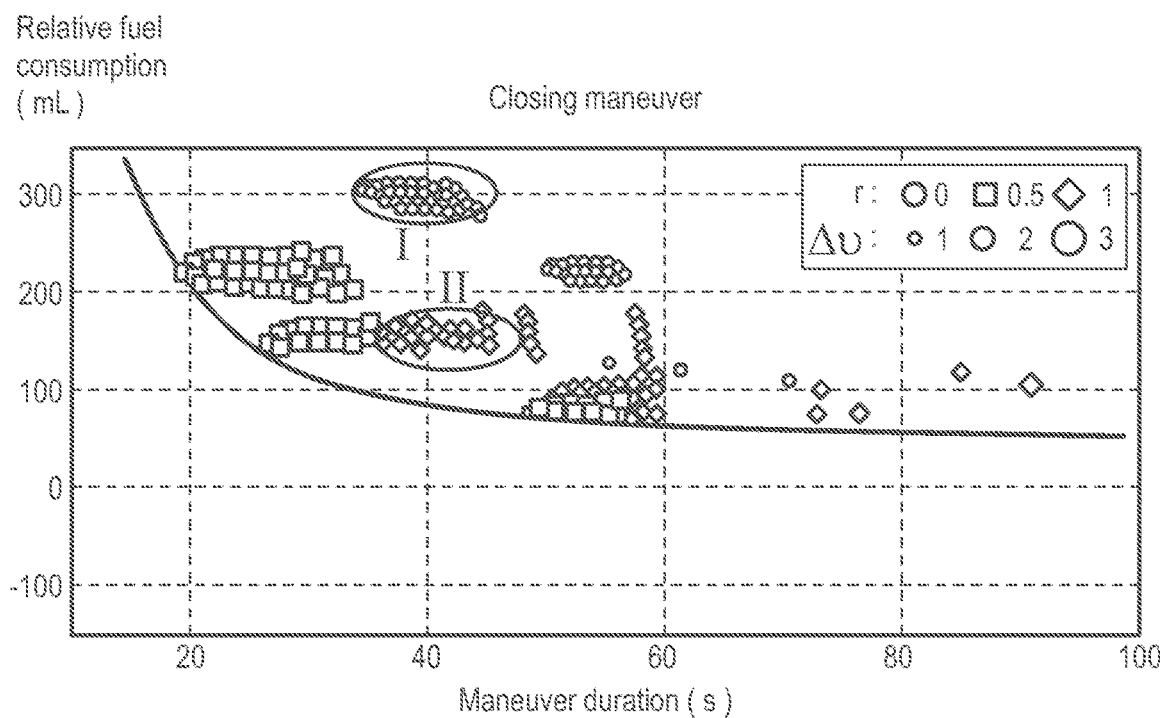
FIG. 10a shows a performance evaluation without drag force correction of closing the gap maneuvers for different parameter combinations in exemplary embodiments.
Figure 10B:
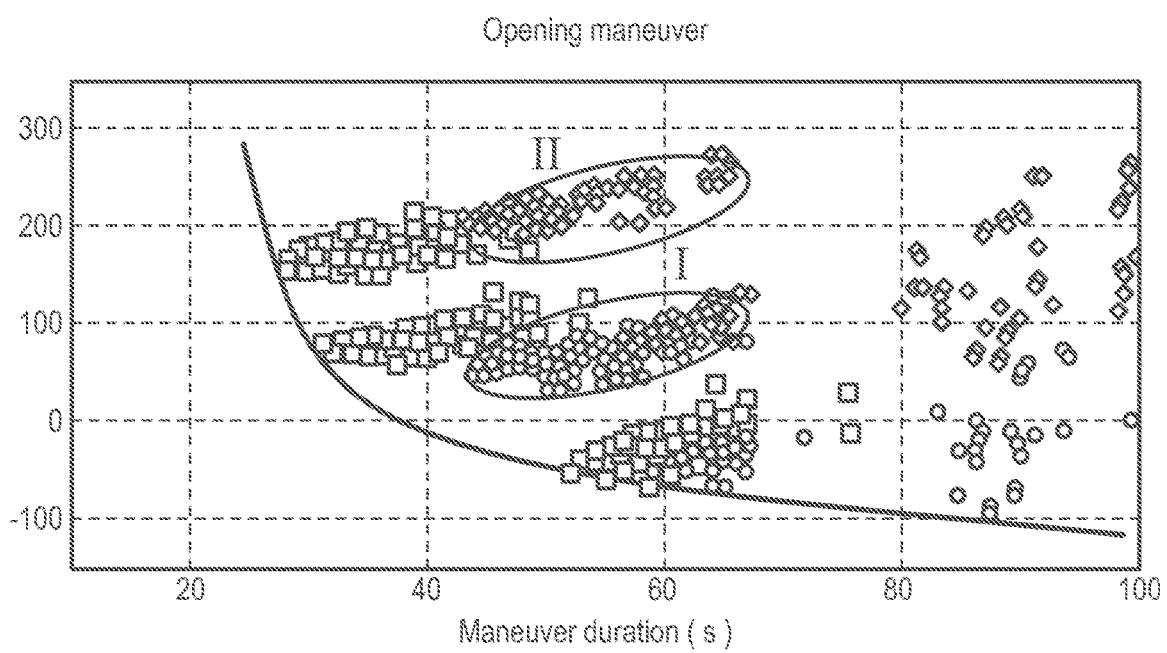
FIG. 10b shows a performance evaluation without drag force correction of opening the gap maneuvers for different parameter combinations in exemplary embodiments.

FIG. 10 shows the relationship between the relative fuel consumption and the maneuvering time for the two maneuvers when no drag force correction is applied. FIG. 10 shows a performance evaluation without drag force correction of (a) closing the gap and (b) opening the gap maneuvers for different parameter combinations in disclosed embodiments. The different markers depict the different versions of the CACC algorithm: Bullets stand for the classical front reference; squares for the center reference, optimized for time; and diamonds for the back reference, r∈{0, 0.5, 1}, respectively. The sizes of the markers are proportional to the maximal speed deviation Δv∈{1, 2, 3} m/s. The bold curve indicates the approximate Pareto front, that is the line for which the improvement of one objective is obtained with the deterioration of the other.

This set of results shows that a 20 s closing maneuver is achievable at a cost of a 200 mL increase in fuel consumption. The opposite maneuver shows similar results, with a minimum maneuvering time of 30 s. This larger minimum maneuvering time results from an intrinsic property of the controller, which is more flexible for IVD deviations when IVD is large. Another notable difference is that it is possible to perform the opening maneuver with a negative relative fuel consumption. This is made possible by some trucks slowing down with low speed variations. The maneuvers having this property are however the slowest, lasting more than 50 s.

For the same $\Delta v$, the middle reference always outperforms the two other references, at the cost of a larger fuel consumption. As expected, "catching up" (front reference) to close the gap will consume more fuel than slowing down, and vice-versa. An interesting result for the strategy choice is the approximate symmetry between the front and back reference across the two maneuvers (highlighted with the ellipses and Roman numbers in FIG. 10). For instance, by switching between the two references, it is possible to perform the two maneuvers in 80 s while investing less than 300 mL.

Figure 11A:
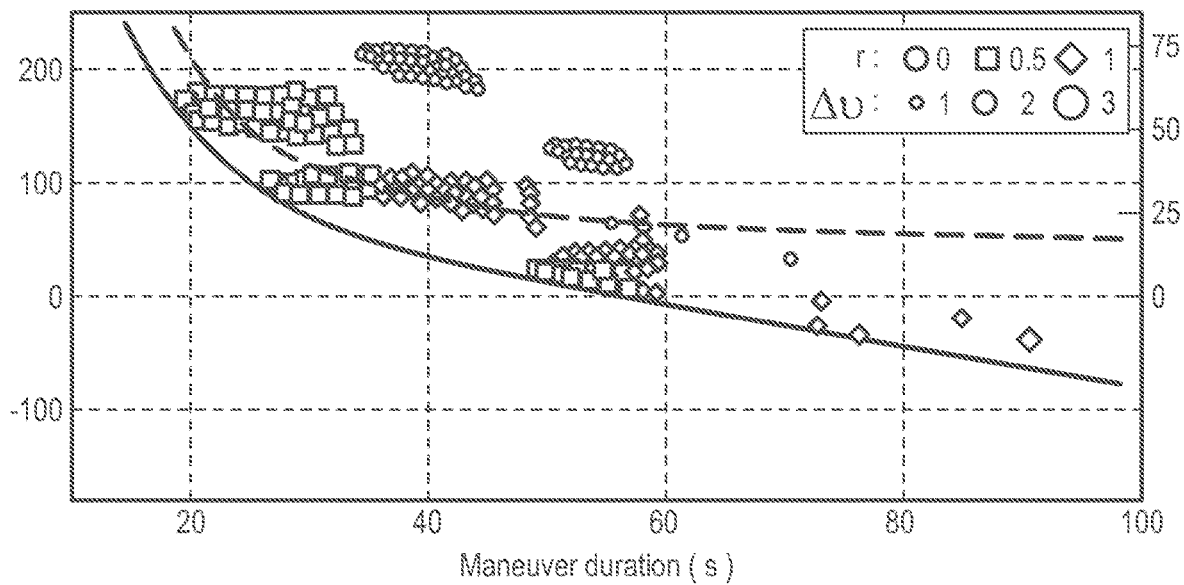
FIG. 11a illustrates a performance evaluation with drag force correction of closing the gap maneuvers for different parameter combinations in exemplary embodiments.
Figure 11B:
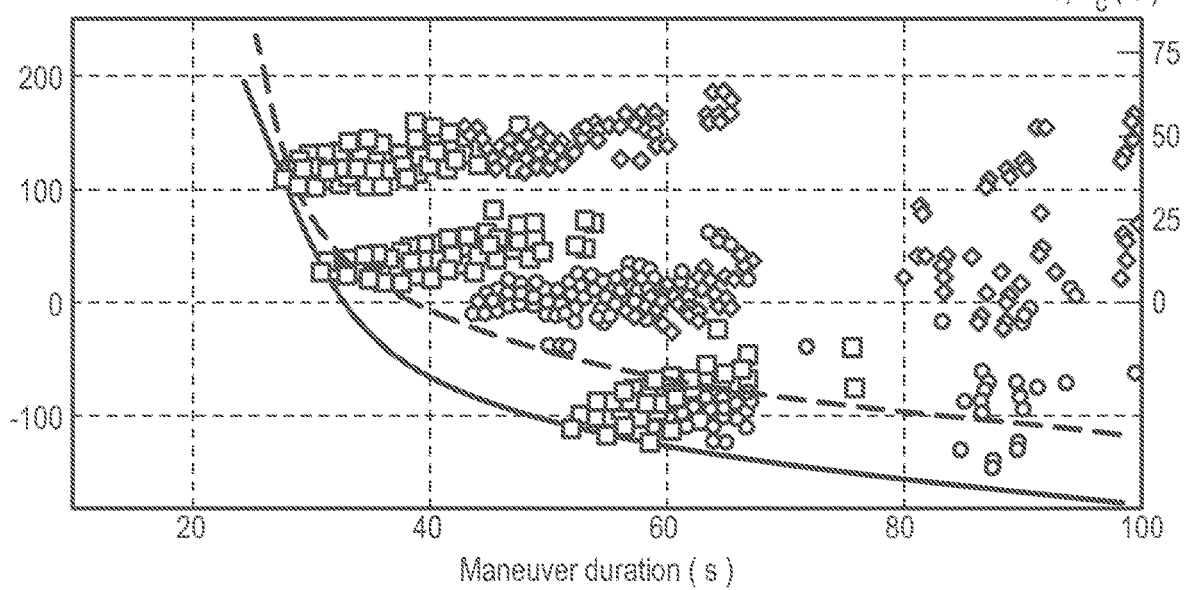
FIG. 11b illustrates a performance evaluation with drag force correction of opening the gap maneuvers for different parameter combinations in exemplary embodiments.
Figure 12A:
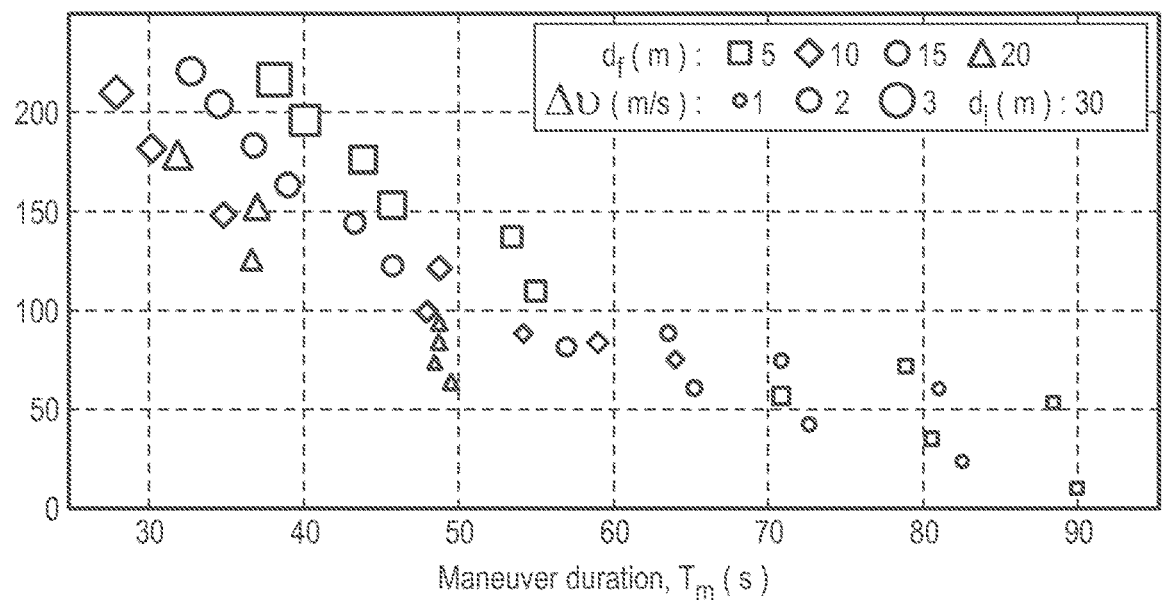
FIG. 12a shows selected results of the extended embodiment simulations: Closing maneuver for a fixed initial IVD di=30 m for front references.
Figure 12B:
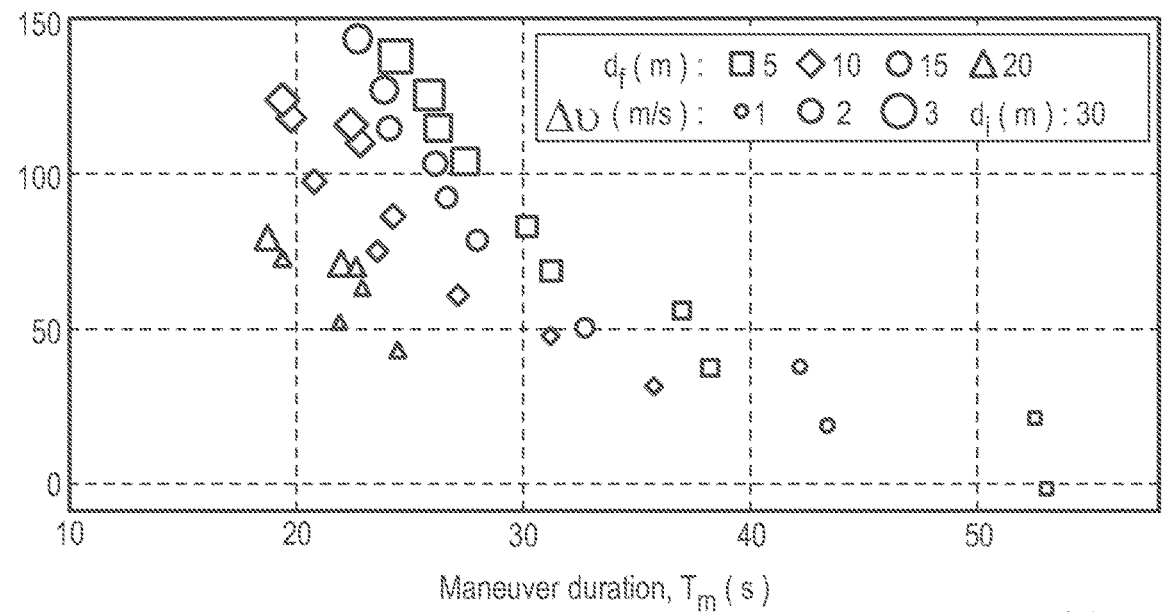
FIG. 12b shows selected results of the extended embodiment simulations: Closing maneuver for a fixed initial IVD di=30 m for middle references.
Figure 12C:
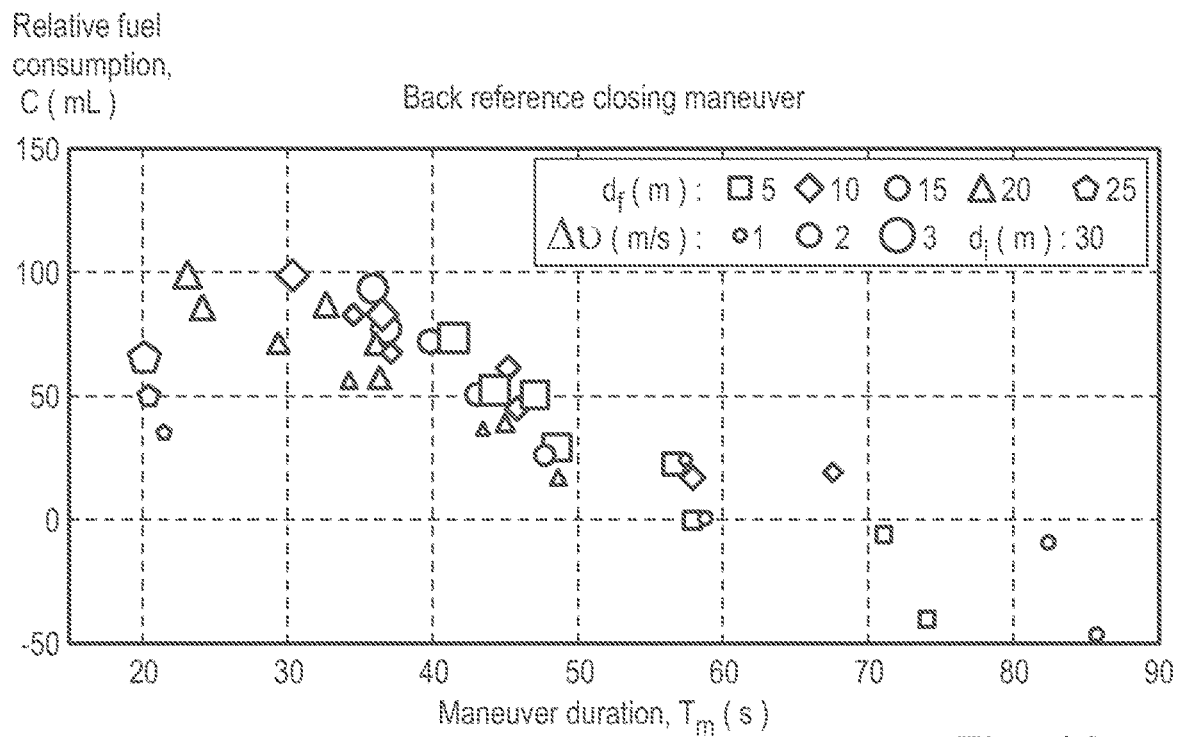
FIG. 12c shows selected results of the extended embodiment simulations: Closing maneuver for a fixed initial IVD di=30 m for back references
Figure 12D:
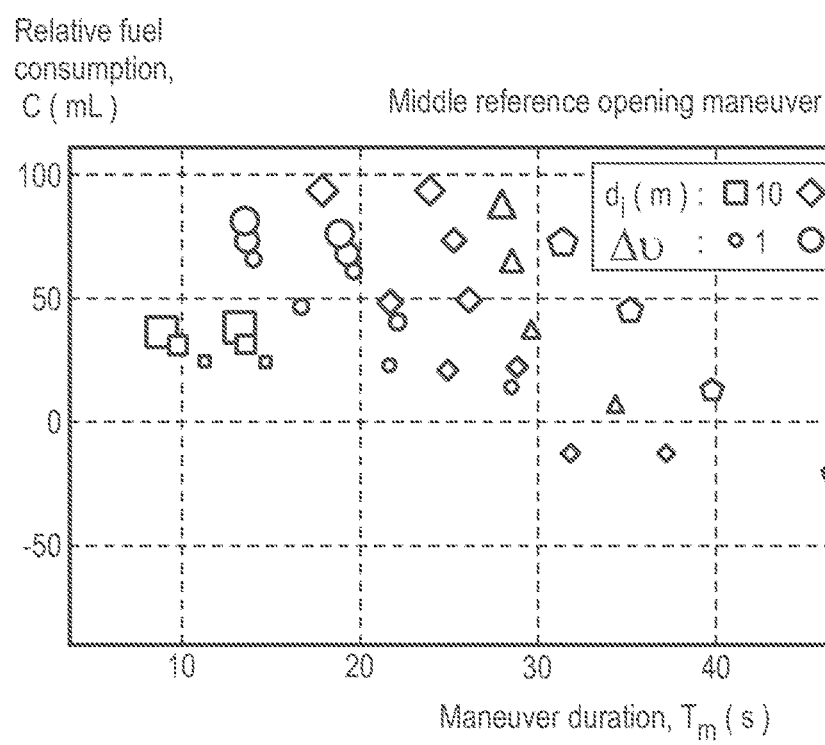
FIG. 12d shows selected results of the extended embodiment simulations: Closing maneuver for a fixed initial IVD di=30 m for a middle reference opening maneuver for a fixed final distance df=5 m.

Allowing for larger $\Delta v$ generally decreases the maneuver time whilst increasing the fuel consumption. This parameter has the largest and most significant impact on the two objectives, compared to the maximum acceleration and the control gain (for readability purposes, these parameters are not highlighted in FIG. 11). For the second set of results, the drag force correction model is applied on the timeseries before computing the metrics. FIG. 11 provides the resulting relationship between the two metrics for both maneuvers.

FIG. 11 illustrates a performance evaluation with drag force correction of (a) closing the gap and (b) opening the gap maneuvers for different parameter combinations in exemplary embodiments. The marker shape and size schemes are identical to the previous figure. The approximate Pareto frontier of the uncorrected results has been added in dashed for comparison purposes. The trends highlighted in the description and analysis of the previous set of results generally hold once the aforementioned correction is applied.

When reducing the IVD, a 50 mL difference in relative fuel consumption for the fastest maneuvers can be observed. This difference is smaller for the slower maneuvers, which are reaching 140 mL. This behavior results from the fact that while reaching their target formation more slowly, these maneuvers already benefit from the reduced drag force. This difference would be largely compensated if computing the relative fuel consumption over a fixed time period. Another notable feature is that the difference is larger for front reference data points than for back reference. Indeed, the benefit is larger when the front transportation vehicles get closer first.

The opening maneuver shows a smaller dependency of the corrections to the maneuver time. These are stable between 50 and 60 mL of the middle and front references. Here, the back-reference maneuvers benefit the most from HDPL, as the front trucks keep the small IVD longer. FIG. 11 also indicates the HDPL time necessary to compensate the fuel investment, using the aforementioned value of 2.92 mL/s. Fast maneuvers tend to yield very high compensation time, motivating to find an appropriate trade-off considering the available PQoS timeseries.

The previous simulation results show the importance of the HDPL maneuvers reference and velocity boundaries in the duration and fuel consumption in the opening and closing maneuvers. One clear limitation of these results is the fact that a decision can only be made regarding the benefit of HDPL based on one initial and one final IVD. New combinations of initial and final IVD, di and df, can be investigated, respectively: $di \in \{10, 15, 20, 25, 30\}$ m and $df \in \{5, 10, 15, 20, 25\}$ m, with di>df, as reported in the table above along with the other Phase II parameters. Selected results of this new set of experiments are presented in FIG. 12.

FIG. 12 shows selected results of the extended embodiment simulations: Closing maneuver for a fixed initial IVD di=30 m for (a) front, (b) middle and (c) back references; and (d) middle reference opening maneuver for a fixed final distance df=5 m. Marker shapes correspond to final IVDs (a-c) and initial IVDs (d). The sizes of the markers are proportional to the maximal speed deviation $\Delta v \in [1, 3]$ m/s.

The subfigures (a-c) show the relationship between relative fuel consumption and maneuvering time for closing maneuvers with di=30 m. A general trend in the dependency between the two metrics can be observed: The metric pairs are placed along a front for each pair {di, df}. This trend is similar to the approximate Pareto-front described in the previous results set. It can also be observed that the parameter $\Delta v$ drives the values along the front, i.e., increasing $\Delta v$ reduces the maneuvering time whilst increasing the relative fuel consumption. These three sets of results also illustrate the main influence of the reference: In comparison to the front reference, the back reference reduces the fuel consumption whilst having little influence on the maneuver duration, whereas the middle reference slightly reduces the fuel consumption but divides the maneuvering time by almost two.

The subfigure (d) provides the results for middle reference opening maneuvers with a fixed df=30 m. Although less distinct, the aforementioned trends also hold. These observations can be used as motivation for developing a model that would provide the relative fuel consumption and the maneuver duration given a {di, df} pair, a reference r and a maximum velocity deviation $\Delta v$.

Given a PQoS time series, exemplary embodiments may provide the best or an improved strategy for HDPL, accounting for the fuel consumption and the duration of the closing and opening maneuvers. The first operation is to translate the PQoS time series into a minimum allowed IVD considering the safety of the platoon. An example of such translation is provided in A. Pfadler, G. Jornod, A. El Assaad, and P. Jung, "Predictive Quality of Service: Adaptation of Inter Vehicle Distance to Packet Inter-reception Time for HDPL," in IEEE 91st Veh. Technol. Conf. (VTC Spring). IEEE, 2020, in review, for the packet inter-reception time (PIR) QoS indicator.

The result of this translation operation can be represented as a pair of values, a favorable time TF and a minimum IVD allowance dm. TF denotes the duration of the allowed dm. The aim is then to choose an final IVD df and the corresponding r and $\Delta v$ for the closing and opening maneuvers. The platoon should only change its IVD to df with di>df≥IVDmin if it is possible to execute the opening and closing maneuver and save fuel within a duration TF. di denotes the initial IVD and is the IVD of the platoon before starting the maneuver. It is assumed that after the HDPL maneuver, the platoon targets the same distance.

One of the main benefits from HDPL is fuel saving. Disclosed embodiments may Aim at maximizing this benefit whilst respecting the constraints imposed by the QoS time series, viz. the dm and TF, the minimum drivable IVD and the time during which it is possible to drive it, respectively. The optimization problem can then be formulated as $$\max\ F_S \quad (13)$$
$$\text{s.t.}\quad d_i > d_f \geq d_m,$$

Where FS is the effective fuel saving after deducing all maneuver investments. FS can be derived as a function of different maneuvering parameters. A continuous model for the relationship between maneuver fuel investments and times can be proposed. An evolutionary algorithm can be applied to solve the problem and present its results.

To provide a solution to (13), the dependency of FS on the maneuvering parameters needs to be investigated. FS is a function of the effective fuel saving time TH and the fuel saving rate $c_{d_f}$ of the chosen target IVD df:

$$F_S = c_{d_f} T_H. \quad (14)$$

With $c_{d_f} = f(d_f)$ as described by FIG. 9. The effective fuel saving time TH is equal to the time during which the HDPL benefits from the small IVD. It takes all maneuver investment into account, e.g., cost of closing and opening the gap. These maneuver investments are taken into consideration as compensation times for the opening and closing maneuvers. The compensation time corresponds to the time during which the HDPL has to maintain its target IVD to save enough fuel to compensate a maneuver fuel investment. The compensation time for closing and opening maneuvers can be denoted as $T_{C_c}$ and $T_{C_o}$, respectively. Both are obtained by dividing the maneuver relative fuel consumptions C by the fuel saving rate $c_{d_f}$, which depends on the chosen df.

$$T_C = \frac{C}{c_{d_f}}, \quad (15)$$

Accounting for the maneuvering times, TH can be expressed as a function of the favorable time TF:

$$T_H = T_F - T_{M_c} - T_{C_c} - T_{M_o} - T_{C_o} - T_{C_d}, \quad (16)$$

Where $T_{M_c}$ and $T_{M_o}$ are the durations of the closing and opening maneuvers, respectively. The results presented in the previous section support that for some combinations of parameters, the compensation time can be null or negative. It is indeed possible to consume no fuel or even save fuel during maneuvers, in which case TH includes part of the maneuvering time. The following table summarizes the different durations involved and FIG. 13 illustrates their dependence to IVDs.

| Notation | Description |
| --- | --- |
| $T_F$ | Favorable PQoS duration |
| $T_{Mc}$ | Closing maneuver duration |
| $T_{Mo}$ | Compensation time of the closing maneuver |
| $T_{Ce}$ | Opening maneuver duration |
| $T_{Co}$ | Compensation time of the opening maneuver |
| $T_{Cd}$ | Compensation time of reference difference |
| $T_H$ | Duration of fuel saving |

Figure 13:
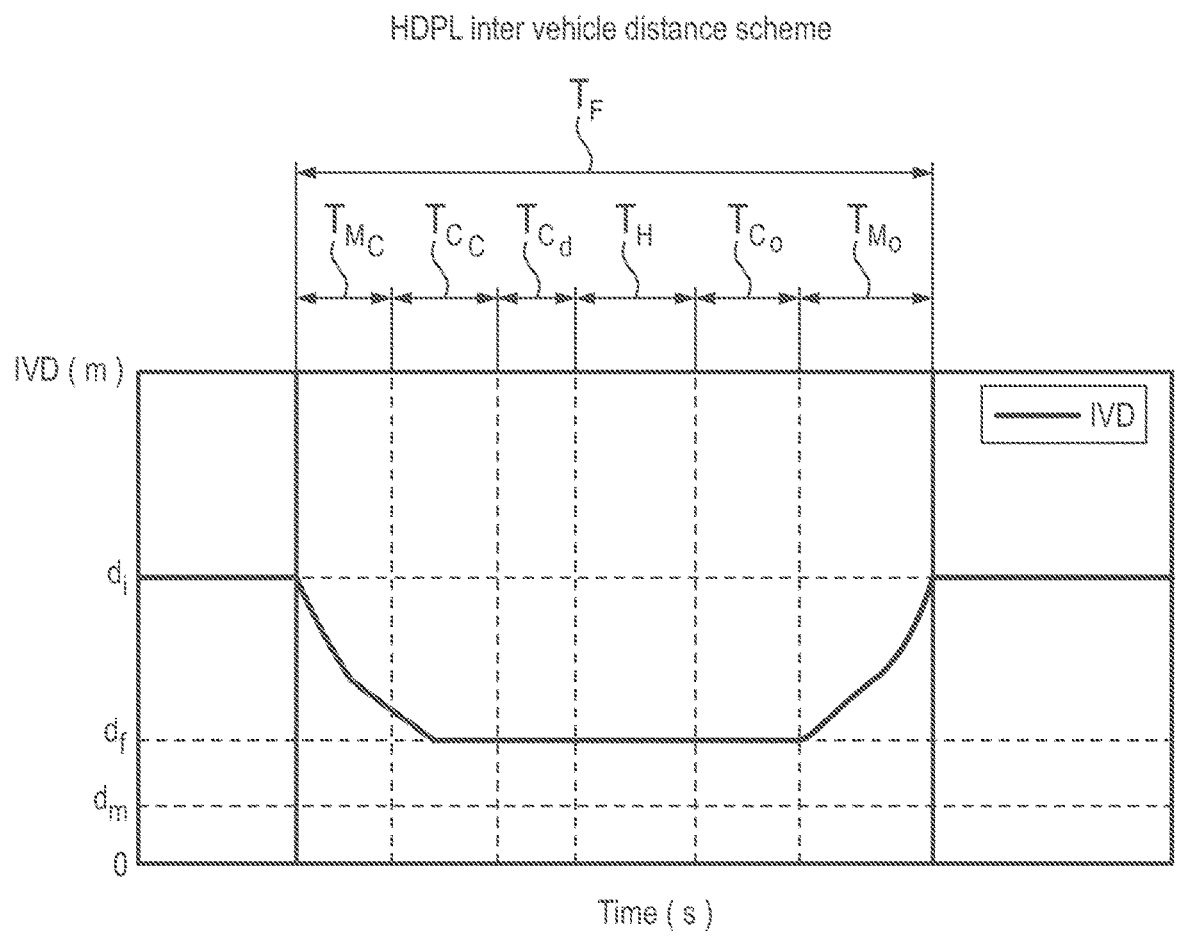
FIG. 13 is an illustrative representation of the IVD during the transformation between platooning to HDPL and return from HDPL to platooning in an exemplary embodiment.

FIG. 13 is an illustrative representation of the IVD during the transformation between platooning to HDPL and return from HDPL to platooning in an exemplary embodiment. It represents the IVD during closing and opening maneuvers, each maneuver compensation time and fuel saving duration. To compute the relative fuel consumptions, a platoon not performing any maneuver can be used as baseline. When the references for the opening and closing maneuvers are the same, the overall traveled distance remains identical as the baseline. However, when different references are used, this traveled distance is different (see FIGS. 3 and 14) and needs to be taken into consideration. Indeed, the platoon will consume fuel to travel a positive distance difference, or has saved fuel when it is negative.

Figure 14:
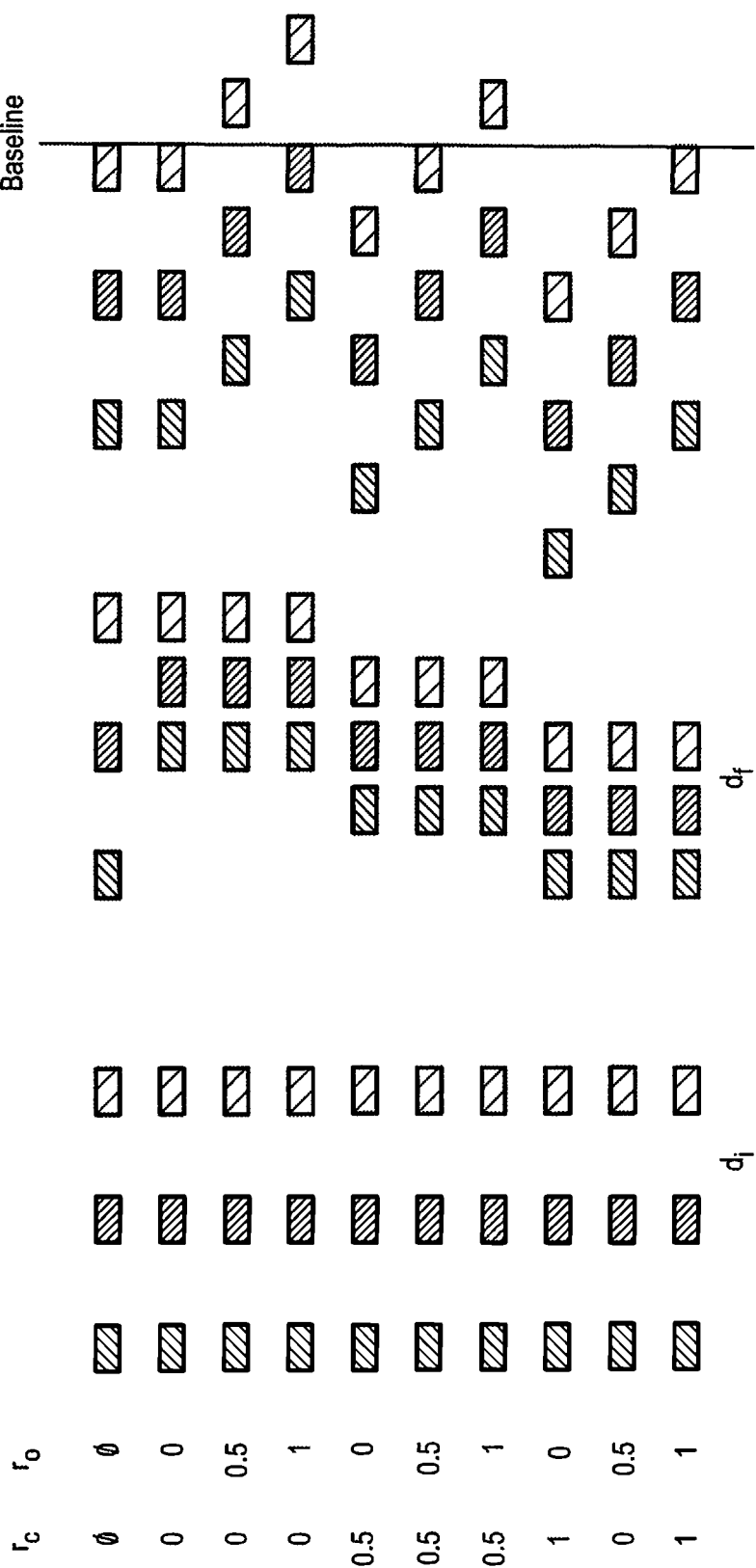
FIG. 14 shows an illustration of the influence of combinations of references on the final distance budget in an exemplary embodiment.

FIG. 14 shows an illustration of the influence of combinations of references on the final distance budget in an exemplary embodiment. This example shows a three-truck platoon performing a closing maneuver and a closing maneuver with different references. Depending on the combination, the platoon would have "won" or "lost" distance compared to the baseline, just like detailed above with respect to FIG. 3. To account for it in the analysis, the traveled distance compensation time $T_{C_D}$ is introduced. It corresponds to the time during which the HDPL has to maintain its target IVD to compensate the fuel related to the distance difference. $T_{C_D}$ has the opposite sign of the distance difference. A negative $T_{C_D}$ is then equivalent to extend TH. $T_{C_D}$ is computed as $$T_{C_d} = \frac{4(d_i - d_f)(r_o - r_c)\sum_{i=0}^{S} c_{i,b}|d = d_f}{v_g c_{d_f}} \quad (17)$$

where $c_{i,b}|_{d=df}$ is the baseline instantaneous fuel consumption of the truck i at IVD $d=d_f$, and $r_c, r_o = \{0, 0.5, 1\}$.

From the results in the previous section, it can be seen that the maneuvering times and the maneuvering fuel consumptions are dependent on the reference, the maximal speed deviation, the initial and final IVDs. Compared to these two parameters, the gain and maximal acceleration deviation have negligible influence and are ignored in the following. The compensation times are dependent on the fuel consumptions and the fuel saving rate, which itself depends on the initial and final IVDs. A optimization problem can be formulated in the following form:

$$\max_{\Gamma}\ F_S(\Gamma) \quad (18)$$
$$\text{s.t.}\quad d_i > d_f \geq d_m,$$
$$\Gamma = (r_c, r_o, \Delta v_c, \Delta v_o, d_f)$$

where the indices c and o correspond to the closing and maneuver. Fixing $d_i$ to the original target IVD of the platoon, five degrees of freedom in $\Gamma$ are obtained. To be able to optimize the fuel saving given a PQoS time series, parameters need to be related to the duration and fuel consumption of the maneuvers. In disclosed embodiments, fuel consumptions may be accounted for as compensation times. Continuous models for $T_{Mc}$, $T_{Mo}$, $T_{Cc}$ and $T_{Co}$ may be derived.

In the following maneuver performance modelling with be described for an exemplary embodiment. Whilst describing the extended results of the simulations as well as in the previous paragraph, the design of a model yielding the relative fuel consumption and the maneuver duration is motivated. This modeling should be based on initial and final IVDs, a reference and a maximum speed deviation.

In some disclosed embodiments, a least absolute shrinkage and selection operator (Lasso) model, cf. R. Tibshirani, "Regression shrinkage and selection via the lasso," Journal of the Royal Statistical Society (Series B), vol. 58, pp. 267-288,1996, are fit to the data. Lasso is a regression method that executes a variable selection and regularization operation to improve the prediction accuracy. On top of the least square regression, Lasso constraints the sum of the coefficient absolute values under a threshold. As a result, the coefficients of the parameters with small or no influence on the predicted variable are set to zero or close to it. This constraint implements both the regularization and the variable selection. Considering p covariates xi=(x1, x2, . . . , xp)T and a single outcome y, the Lasso parameters βL are computed using the following minimization:

$$\hat{\beta}^L = \arg\min_{\beta \in R^p} \|y - X\beta\|_2^2 + \lambda\|\beta\|_1, \quad (19)$$

where β is the vector of coefficients, X the matrix of observations and λ is a tuning parameter, a positive or null constant that represents the shrinkage penalty. Lasso is a univariate analysis method: The two observed variables, duration and relative fuel consumption, have therefore to be modeled separately.

When executing a closing maneuver, the platoon saves more fuel at the end of the maneuver than at the beginning. This is reinforced by the shape of the IVD time series (which can be deduced from the graph deviation time series in FIG. 7). Indeed, a longer part of the maneuver occurs at small IVDs due to the behavior of the proportional part of the controller. The opening maneuver is the opposite, as it starts at the most profitable IVDs to then move quickly away from it. In the same conditions (initial and final IVDs, and reference), both maneuvers take approximately the same duration, but opening saves more than closing, as it is possible to notice when comparing FIGS. 12(b) and 12(d).

Each maneuver reference induces a different behavior in terms of transportation vehicles movement. This impacts the aerodynamic conditions variation and therefore the fuel consumptions on the one hand, and the maneuver duration on the other hand. Front and back references usually yield similar durations and different consumptions (with a symmetry, as highlighted in FIG. 10). Middle reference normally yields the shortest maneuvers, as FIG. 11 shows.

Both the references (front, middle and back) and the types of maneuver (opening and closing) can be considered as categorical variables. Accounting for these features as continuous variable in the Lasso model can drastically impair the performance of the modeling. These categorical variables can be taken into account by fitting six models (three references times two maneuvers) for the two target values. This results in 12 regression models.

The inputs of these regressions are the initial and final IVDs, di and df respectively, and the speed boundaries Δv. Observing the shapes of the different points in the results presented in the previous section, the target variables show a polynomial dependency on speed boundaries. Considering the regularization feature of the Lasso regression, the polynomial combination of our features can be taken without risking over-fitting. To establish the degree of the polynomial combinations and the shrinking penalty λ, an exhaustive grid search can be performed with k-fold cross validation. The coefficient of determination r2 can be used as scoring function and k=3. If the degree of the polynomial is almost always 3 for the 12 models, the best value of λ is varying. This reinforces the usage of the grid search for all 12 models instead of fitting the hyper-parameters on one model only.

Figure 15A:
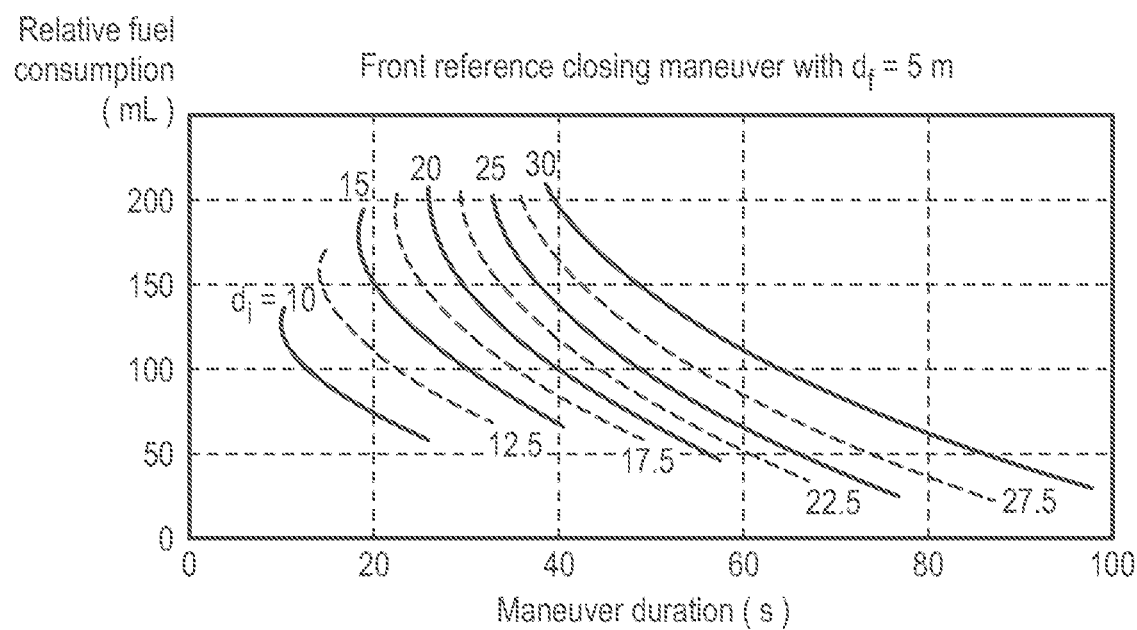
FIG. 15a illustrates a surface model created by the graphical combination of the maneuver's duration and relative fuel consumption in an exemplary embodiment using a first lasso regression model.
Figure 15B:
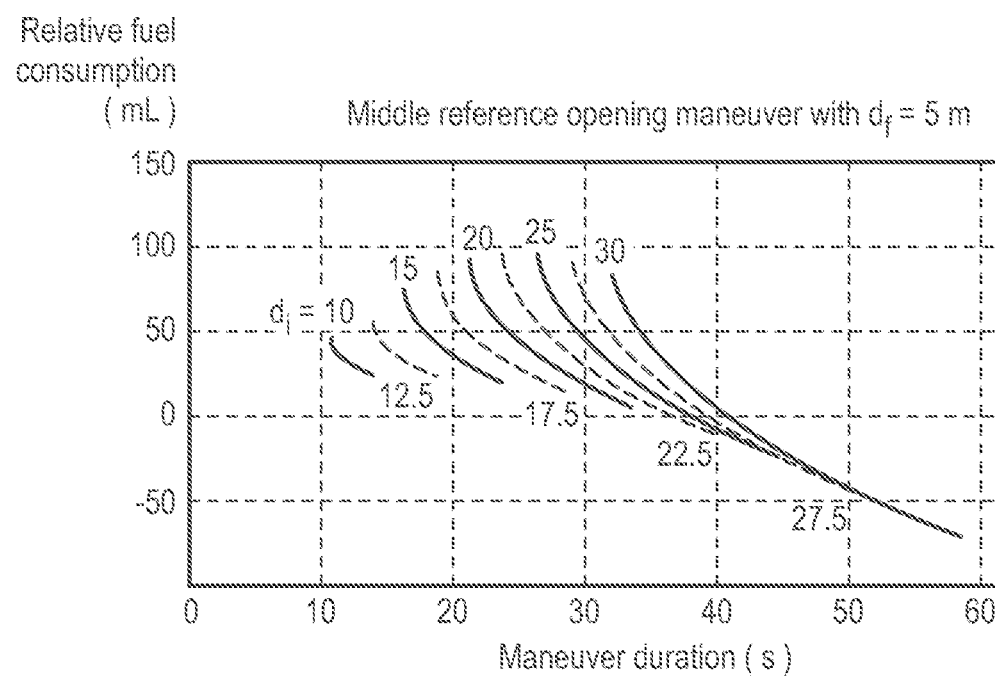
FIG. 15b illustrates a surface model created by the graphical combination of the maneuver's duration and relative fuel consumption in an exemplary embodiment using a second lasso regression model.

For each combination of the categorical variables, reference and maneuver type, a continuous model linking the target features to the three predictors can be obtained. FIG. 15 presents the exemplary outcomes for a front reference closing maneuver and a middle reference opening maneuver.

FIG. 15 illustrates a surface model created by the graphical combination of the maneuver's duration and relative fuel consumption in an exemplary embodiment using lasso regression models. The continuous lines represent the outcome of the models to simulate di and df combinations. The dashed lines represent some examples of maneuvers that were not simulated, and which performances were obtained using the continuous models. The fixed di is represented on the top, continuous, or bottom, dashed, of each correspondent line. The continuous lines in (a) correspond to the model's continuous outcome to the same di and df combinations represented in FIGS. 12(a) and (b) to the ones in FIG. 12(d).

In this result set, df=5 m is fixed for representation purposes. To illustrate the interpolation capability of the resulting models, in addition to the results for the simulated initial IVDs values, the results for values unknown to the model are shown. The evolution of the curve's position depending on the initial IVD corroborates the insight gathered in the analysis of the results presented in FIG. 12.

The obtained Lasso regressions may allow obtaining relative fuel consumption and maneuver durations for every combination of maneuver (closing and opening), reference (front, middle, back) and initial and final distance, with di∈ ]5,30] m, df∈ [5,30[ m and di>df. Applying equation (15) on the obtained fuel consumptions, FS can be computed for any combination of input parameters Γ.

To verify the latter constraint, the obtained regression models can be used to compute the fuel consumptions and the durations of the maneuvers. For functional safety reasons, it can be assumed that the closing maneuver should not start before the communication requirements are met. Similarly, the opening maneuver should finish whilst the communication requirements are met.

Given a PQoS time series and its translation into a minimum IVD time series, this time series can be described with two values, dm and TF. The objective function described in the previous paragraphs has the drawback of being non differentiable when considering the different references. This feature of the objective function prevents the use of any gradient-based method such as gradient descent and quasi-newton methods. To find the five parameters that maximize the fuel saving in (18), some disclosed embodiments use an intensive search optimization algorithm.

Particle swam optimization (PSO) may be used, which is an evolutionary algorithm that performs an iterative stochastic optimization, cf.

J. Kennedy and R. Eberhart, "Particle swarm optimization," in 1995 Int. Conf. Neural Networks (ICNN'95), vol. 4, November 1995, pp. 1942-1948 vol. 4, and Y. Shi and R. Eberhart, "A modified particle swarm optimizer," in 1998 IEEE International Conference on Evolutionary Computation Proceedings. IEEE World Congress on Computational Intelligence (Cat. No. 98TH8360), May 1998, pp. 69-73.

In PSO, the set of candidate solutions is called a swarm of particles. The particles navigate in a multi-dimensional search space according to their position and velocity. At each operation, these are updated depending on their own best experience, as well as the population best experience and stochastic parameters. The combination of global and local best, as well as the use of randomness in the update attempt to avoid the search to get trapped in local minima. PSO is however a metaheuristic: it may achieve a good solution but does not guarantee a global optimal solution.

At each iteration k, the particles position vector x and velocity vector v are updated according the following equations:

$$x^{k+1} = x^k + v^{k+1} \quad (20)$$

$$v^{k+1} = wv^k + c_1 r_1 (p_{lb} - x^k) + c_2 r_2 (p_{gb} - x^k), \quad (21)$$

where w is a weight factor and corresponds to the inertia of the particle; $c_1$ and $c_2$ are constants and determine the influence of particle and group experiences, respectively; $r_1$ and $r_2$ are two random numbers that are drawn from a uniform distribution U(0,1) each time equation (21) is applied; $p_{lb}$ (resp. $p_{gb}$) is the position where the particle (resp. the swarm) had the best performance. w, $c_1$ and $c_2$ are hyperparameters which need to be set in advance. In addition, PSO also requires the definition of the population size N and the iterations number I. The search-space dimensions number D is intrinsic to the optimization problem. Finally, in equs. (20) and (21), positions are limited to a bounding box, and each velocity component is bounded to an absolute velocity maximum. Algorithm 1 summarizes the functioning of the algorithm, with position, velocity and best position updates.

Algorithm 1: Particle Swarm Optimization (PSO)
1 objective function, g(x);
  Input: N, I, D, $v_{max}$
  Output: global best position, $p_g b$
2 Initialize position and velocity;
3 for each iteration k=1, . . . , I do
4 for each particle i=1, . . . , N do
5 Calculate objective function, $g(x_i^k)$;
6 Actualize the global and local best position;
7 for each dimension d=1, . . . , D do
8 Calculate velocity, $v_i^{k+I}$
9 Update particle position, $x_i^{k+I}$
10 end
11 end
12 end A grid search-based method for the hyperparameter optimization can be used. The objective function can be set as scoring method. The search grid can be applied to several combinations of favorable duration, TF, initial IVD, di and minimum IVD. The chosen hyperparameter tuple is the one that makes PSO yield the best solution the most frequently.

In some disclosed embodiments an ultimate goal can be to choose a set of parameters for the closing and the opening maneuver that will maximize the fuel saving, and, in turns, to derive the prediction horizon value. To do so, the optimization can be performed with different sets of TF and dm. The fuel saving can be observed as a function TF for different values dm and obtain an order of magnitude of the prediction horizon.

Figure 16:
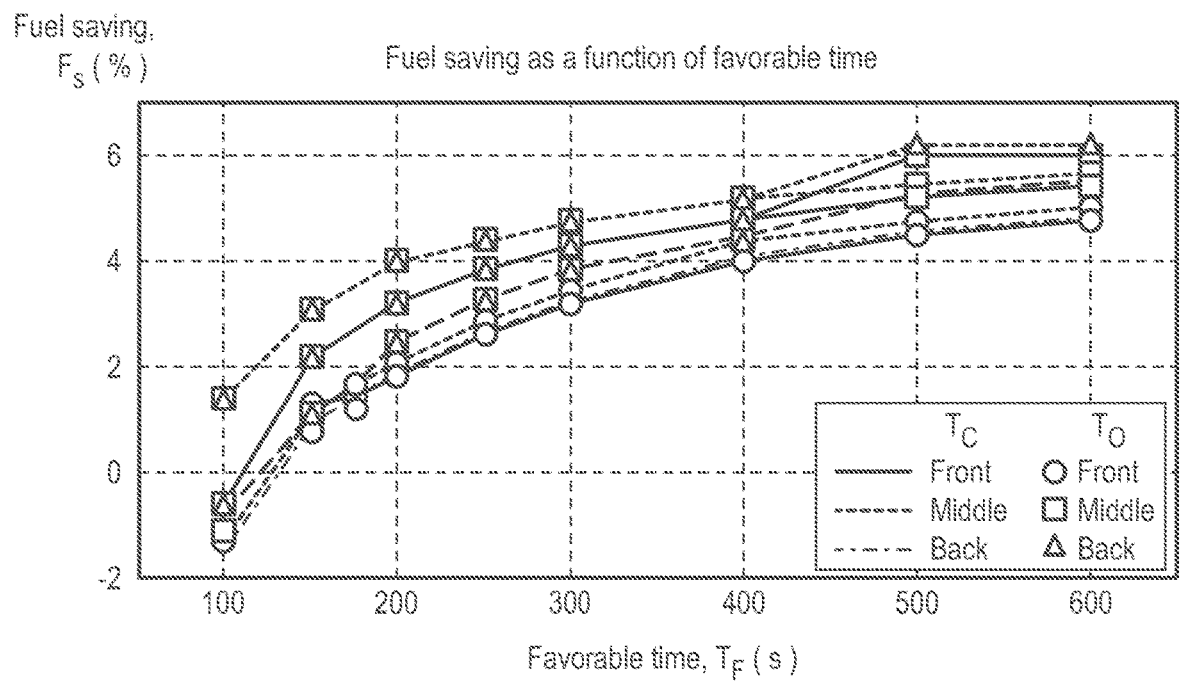
FIG. 16 shows fuel saving in percentage as a function of the favorable time for df=5 m in an exemplary embodiment.

FIG. 16 shows the results of the fuel saving optimization with a minimum IVD dm=5 m and an initial IVD di=30 m. FIG. 16 shows fuel saving in percentage as a function of the favorable time for df=5 m in an exemplary embodiment. Each curve represents a combination of references for the closing and opening maneuver. It can be observed that most of the time, the combination of the middle references gets the highest saving. Right under is also most of the time the combination of middle and back references. Finally, the classical front references are performing the worst.

Here, 5 m is the minimum constraint, the platoon can target any IVD between dm and di. The maximal fuel saving may generally be achieved by a combination containing the proposed middle reference strategy. Also, the fuel saving is very close to 0% when TF=100 s, providing an approximate minimum for the favorable time and for the prediction horizon. Generally, all strategies outperform the classical approach with front reference for all maneuvers. Finally, all curves tend to a plateau. This plateau represents the maximal fuel saving in percentage, which is reached when the maneuver costs become negligible compared to the fuel saved at low IVD. This happens around 600 s, meaning that, at 90 km/h, a platoon needs to drive 15 km before the maneuver costs become negligible.

Disclosed embodiments are based on the above study of maneuvering strategies to achieve fuel efficiency while doing high density platooning. Disclosed embodiments may use the concept of reference placement in a platoon control system to balance between the two objectives of this problem: the fuel consumption and the duration of the maneuver minimizations. The relationship between these two metrics can be studied as a function of different maneuver parameters. Disclosed embodiments might not only consider the fuel saving achieved by driving small headways but also during the maneuver by developing a fuel consumption correction method. It can be shown that some strategies achieve fuel saving while performing the maneuver, at a cost of longer maneuvering durations. This correction model also allows linking the fuel consumption of the maneuver with a compensation time.

Using these results, the required prediction horizon for a predictive quality of service system can be computed in some exemplary embodiments. This time is dependent on how far in the future the favorable quality of service will occur, as it drives the minimum maneuvering time. The application of this prediction horizon derivation on a packet inter-reception time prediction timeseries can be used in some exemplary embodiments. It can be shown that to actually achieve fuel efficiency with a minimum IVD of 5 m, a platoon requires a projection of around 100 s in the future, considering that the quality of service is provided without any cost.

These results provide the prediction horizon requirements for quality of service prediction systems in the scope of high-density platooning systems. Linked with a system providing the feasible inter-vehicle distance considering the future quality of service, this decision-making strategy will be an enabler for agile quality of service adaptation in some disclosed embodiments.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the methods described herein or (field) programmable logic arrays ((F)PLAs) or (field) programmable gate arrays ((F)PGAs), programmed to perform the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and exemplary embodiments, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other exemplary embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS

10 Method for controlling a maneuver within a platoon of a plurality of transportation vehicles
12 receiving information related to a maneuver for the platoon
14 determining information on a fuel efficiency of the maneuver
16 deciding on whether to perform the maneuver based on the information on the fuel efficiency
20 apparatus for controlling a maneuver within a platoon of a plurality of transportation vehicles
22 one or more interfaces
24 control module
100 transportation vehicle/network component
102 transportation vehicle
400 mobile communication system

The invention claimed is:

1. An apparatus for controlling a maneuver within a platoon of a plurality of transportation vehicles, the apparatus comprising:
one or more interfaces for communicating with one or more of the plurality of transportation vehicles of the platoon of; and
a control module to control the one or more interfaces to receive information related to a maneuver for the platoon,
wherein the control module determines information indicating a fuel efficiency of the maneuver based on fuel consumptions for maneuvering from an initial state to a maneuver target state, keeping the maneuver target state, and reverting from the maneuver target state to the initial state,
wherein the control module decides whether to perform the maneuver based on the determined fuel efficiency information, and
wherein the control module is configured to control one or more of the plurality of transportation vehicles to perform the maneuver, or to not perform the maneuver, based on the decision whether to perform the maneuver.

2. The apparatus of claim 1, wherein the maneuver is a high-density platooning maneuver for which an inter-vehicle distance of the maneuver target state is determined based on a communication latency between the transportation vehicles.

3. The apparatus of claim 2, wherein the control module determines the inter-vehicle distance for the maneuver target state based on a predicted quality of service for inter-vehicle communication in the platoon.

4. The apparatus of claim 1, wherein the information on the fuel efficiency is further based on an overall duration for maneuvering from an initial state to a maneuver target state, keeping the maneuver target state, and reverting from the maneuver target state to the initial state.

5. The apparatus of claim 1, wherein the determining comprises determining an effective time for the maneuver target state, wherein the effective time is based on the maneuvering from the initial state to the maneuver target state, the keeping of the maneuver target state, and the reverting from the maneuver target state to the initial state.

6. The apparatus of claim 5, wherein the determining comprises determining the fuel efficiency information based on the effective time for the maneuver target state and a fuel saving rate during the maneuver target state.

7. The apparatus of claim 6, wherein the determining of the effective time for the maneuver target state comprises determining an actual time for maneuvering from the initial state to the target state and a compensation time for the maneuvering from the initial state to the target state, and wherein the determining of the effective time for the maneuver target state comprises determining an actual time for reverting from the target state to the initial state and a compensation time for reverting from target state to the initial state.

8. The apparatus of claim 7, wherein the control module evaluates different effective times for different reference points for the maneuvering from the initial state to the target state and for reverting from the target state to the initial state, wherein a reference point indicates a transportation vehicle in the platoon, which forms a maneuver reference for the other transportation vehicles in the platoon.

9. The apparatus of claim 8, wherein the different effective times result in different actual times and different compensation times, wherein at least one of the compensation times is negative.

10. The apparatus of claim 1, wherein the transportation vehicles of the plurality of transportation vehicles communicate with each other using a mobile communication system and wherein the maneuver is determined based on a predicted quality of service in the mobile communication system.

11. The apparatus of claim 10, wherein the control module determines an overall duration for the maneuver based on the predicted quality of service.

12. A transportation vehicle comprising the apparatus of claim 1.

13. A network component comprising the apparatus of claim 1.

14. A non-transitory computer readable medium including a computer program having a program code for performing operations of the control module of claim 1 when the computer program is executed on a computer, a processor, or a programmable hardware component.

15. A method for controlling a maneuver within a platoon of a plurality of transportation vehicles, the method comprising:
receiving information related to a maneuver for the platoon;
determining information on a fuel efficiency of the maneuver based on fuel consumptions for maneuvering from an initial state to a maneuver target state, keeping the maneuver target state, and reverting from the maneuver target state to the initial state; and
deciding whether to perform the maneuver based on the determined fuel efficiency information; and
controlling one or more of the plurality of transportation vehicles to perform the maneuver, or to not perform the maneuver, based on the decision whether to perform the maneuver.

16. The method of claim 15, wherein the maneuver is a high-density platooning maneuver for which an inter-vehicle distance of the maneuver target state is determined based on a communication latency between the transportation vehicles.

17. The method of claim 16, further comprising determining the inter-vehicle distance for the maneuver target state based on a predicted quality of service for inter-vehicle communication in the platoon.

18. The method of claim 15, wherein the information on the fuel efficiency is further based on an overall duration for maneuvering from an initial state to a maneuver target state, keeping the maneuver target state, and reverting from the maneuver target state to the initial state.

19. The method of claim 15, wherein the determining comprises determining an effective time for the maneuver target state, wherein the effective time is based on the maneuvering from the initial state to the maneuver target state, the keeping of the maneuver target state, and the reverting from the maneuver target state to the initial state.

20. The method of claim 19, wherein the determining comprises determining the fuel efficiency information based on the effective time for the maneuver target state and a fuel saving rate during the maneuver target state.

21. The method of claim 20, wherein the determining of the effective time for the maneuver target state comprises determining an actual time for maneuvering from the initial state to the target state and a compensation time for the maneuvering from the initial state to the target state, and wherein the determining of the effective time for the maneuver target state comprises determining an actual time for reverting from the target state to the initial state and a compensation time for reverting from target state to the initial state.

22. The method of claim 21, further comprising evaluating different effective times for different reference points for the maneuvering from the initial state to the target state and for reverting from the target state to the initial state, wherein a reference point indicates a transportation vehicle in the platoon, which forms a maneuver reference for the other transportation vehicles in the platoon.

23. The method of claim 22, wherein the different effective times result in different actual times and different compensation times, wherein at least one of the compensation times is negative.

24. The method of claim 15, wherein the transportation vehicles of the plurality of transportation vehicles communicate with each other using a mobile communication system, and wherein the maneuver is determined based on a predicted quality of service in the mobile communication system.

25. The method of claim 24, further comprising determining an overall duration for the maneuver based on the predicted quality of service.

* * * * *